Nov. 15, 1966 R. W. CREAMER 3,285,111

AUTOMATIC PUNCHING APPARATUS

Filed April 24, 1963 16 Sheets-Sheet 1

INVENTOR.
Robert W. Creamer
BY
William S. Dorman
ATTORNEY

Nov. 15, 1966 R. W. CREAMER 3,285,111

AUTOMATIC PUNCHING APPARATUS

Filed April 24, 1963 16 Sheets-Sheet 2

INVENTOR.
Robert W. Creamer
BY
William S. Dorman
ATTORNEY

Nov. 15, 1966 R. W. CREAMER 3,285,111

AUTOMATIC PUNCHING APPARATUS

Filed April 24, 1963 16 Sheets-Sheet 3

INVENTOR.
Robert W. Creamer
BY
William S. Dorman
ATTORNEY

Nov. 15, 1966 R. W. CREAMER 3,285,111

AUTOMATIC PUNCHING APPARATUS

Filed April 24, 1963 16 Sheets-Sheet 4

INVENTOR.

Robert W. Creamer

BY

William S. Dorman

ATTORNEY

Nov. 15, 1966 R. W. CREAMER 3,285,111

AUTOMATIC PUNCHING APPARATUS

Filed April 24, 1963 16 Sheets-Sheet 5

INVENTOR.
Robert W. Creamer
BY
William S. Dorman
ATTORNEY

INVENTOR.
Robert W. Creamer
BY
William S. Dorman
ATTORNEY

INVENTOR.
Robert W. Creamer
BY
William S. Dorman
ATTORNEY

INVENTOR.
Robert W. Creamer
BY
William S. Dorman
ATTORNEY

Nov. 15, 1966 R. W. CREAMER 3,285,111

AUTOMATIC PUNCHING APPARATUS

Filed April 24, 1963 16 Sheets-Sheet 9

INVENTOR.
Robert W. Creamer
BY
William S. Dorman
ATTORNEY

INVENTOR.
Robert W. Creamer
BY
William S. Dorman
ATTORNEY

INVENTOR.
Robert W. Creamer
BY
William S Dorman
ATTORNEY

Nov. 15, 1966 R. W. CREAMER 3,285,111

AUTOMATIC PUNCHING APPARATUS

Filed April 24, 1963 16 Sheets-Sheet 12

INVENTOR.
Robert W. Creamer
BY
William S. Dorman
ATTORNEY

INVENTOR.
Robert W. Creamer
BY
William S. Dorman
ATTORNEY

ALL CONTACTS SHOWN ON RELAYS L8B THRU L7B ARE LEFT BANK CONTACTS.

GAUGE - INCHES AND FRACTIONS

INVENTOR.
Robert W. Creamer
BY
William S. Dorman
ATTORNEY

FRACTION CAM FOR PUNCHING MACHINE CALIBRATED IN SIXTEENTHS OF AN INCH.

INCH CAM FOR PUNCHING MACHINE.

INVENTOR.
Robert W. Creamer
BY
William S. Dorman
ATTORNEY

INVENTOR.
Robert W. Creamer
BY
William S. Dorman
ATTORNEY

United States Patent Office 3,285,111
Patented Nov. 15, 1966

3,285,111
AUTOMATIC PUNCHING APPARATUS

Robert W. Creamer, Fort Worth, Tex., assignor, by mesne assignments, to Numeric Systems of Texas, Inc., Fort Worth, Tex., a corporation of Texas Filed Apr. 24, 1963, Ser. No. 275,433
16 Claims. (Cl. 83—71)

This invention relates to improvements in punch press apparauts and more particularly, but not by way of limitation, to an automatic punch press particularly designed and constructed for automatically selecting the spacing or dimensioning of apertures to be punched in a structural member, or work piece, and punching the apertures in accordance with a predetermined pattern or arrangement. This application is a continuation-in-part of my prior co-pending application Serial No. 157,416, filed December 6, 1961, and now Patent No. 3,221,901 issued December 7, 1965.

It is common practice in the construction industry, and particularly the steel construction industry, to bolt or rivet mating structural members together for forming the framework of a building, bridge or the like. The usual procedure is to punch or otherwise form holes in the structural members for receiving the bolts or rivets prior to the actual riveting or bolting operation. Of course, the holes provided in mating elements must be in substantial alignment in order that the riveting operation may be accomplished in an efficient manner. At present, prior to the punching of the structural elements, and particularly work pieces of such shapes as angles, I-beams, H-beams, channels, or flat stock, the dimensioning or locating of the holes is usually done manually by measuring from a known or given base line or reference point and marking the work piece at the positions to be punched. It will be readily apparent that such a procedure is not only slow, but inefficient due to inherent manual or human errors.

The present invention contemplates a novel automatic punching apparatus wherein the selecting or positioning of the holes to be punched in a piece of stock or work piece is entirely automatic, thus eliminating the human errors as well as greatly decreasing the over-all punching time. Of course, it is to be noted that the work piece may be of substantially any desired type, as hereinbefore set forth, and it is anticipated that many working operations may be accomplished on the work piece in this novel automatic manner, such as welding thereof, bending, scoring, cutting, drilling, perforating or the like, in addition to or in lieu of the punching of holes. For the purposes of illustration, the punching of holes will be set forth in detail herein, it being understood that this in no manner limits the scope of the invention to this particular work operation.

The selection or the positioning of the holes is preferably controlled by a perforated tape member which may be remotely disposed from the punch press machine. The control tape may be prepared in accordance with the desired pattern or arrangement of apertures or holes for the piece of stock, and is utilized for energizing the electrical circuits of the apparatus for moving the stock through the punch press and automatically punching the holes required therein in one over-all operation. The control tape regulates the longitudinal movement of the piece of stock through the machine and controls the stoppage thereof in a plurality of predetermined positions for being punched. The punching apparatus is controlled or positioned with respect to the work piece in accordance with the desired gauge of the hole, or distance of the hole from a given reference position, and then actuated for punching of the work piece. Upon the punching of the hole, the stock is automatically advanced through the machine for being punched at the next succeeding position. The sequence of operations is such that substantially any desired pattern of holes or apertures may be punched on the work piece in accordance with the programming of the control tape. Of course, the invention is not limited to a control by a perforated tape, but may be electrically controlled in any suitable manner, such as by a profiled tape or by other control media embodying a photo-electric cell apparatus, or the like, if desired.

For example, in the punching of a plurality of holes in predetermined patterns on an angle member, the angle member may be disposed on the machine in such a manner that the two legs thereof extend upwardly at approximately forty-five degree angles. A punch machine is provided for each leg of the angle member, and the control tape actuates the apparatus for moving the angle through the machine into a predetermined position with respect to the punching members. The punch press members are slidably mounted for movement toward and away from the heel of the angle member, and upon response to the control tape, the press members for each leg of the angle member are moved toward the respective leg member a sufficient distance to provide the desired gauge for the hole to be punched. The gauge dimension is usually considered to be the distance from the heel of the angle to the center line of the hole. After the positioning of the punch press with respect to the legs of the angle member, the punch mechanism is actuated for the punching of the hole. In the event two holes are to be punched in the same line, but at different gauges, the second punching operation is completed prior to any longitudinal movement of the angle member through the machine. The angle may then be moved longitudinally through the apparatus in response to the signals of the control tape and is positioned for the next succeeding punching operation.

The entire operation of punching and moving the work piece through the machine is completely automatic in response to the program or pattern set up on the control tape. It has been found that great numbers of holes may be punched in relatively short periods of time. In addition, it is possible to punch work piece after work piece with reproducible accuracy whereby mating structural elements may be efficiently bolted or riveted together. Thus, the novel automatic punching apparatus not only greatly reduces the time required for the punching of the holes in a structural member, but also greatly increases the accuracy of the punching operation and facilitates the final assembly operation of the punched elements.

As will hereinafter more fully appear, the over-all punching apparatus includes, first of all, a work station. A pair of punching machines are mounted at the work station for movement in directions transverse to the longitudinal center line of the work piece which is conveyed through the work station. A longitudinally extending support means is provided on both sides of the work station; one side of this longitudinal support includes a track in which a carriage is slidably mounted. The other side of this longitudinal support includes means for placing thereon a longitudinally extending work piece, such as an angle, which can then be drawn through the work piece by the carriage. One end of the carriage includes a clamping member which engages the forward end of the work piece so as to pull the latter through the work station. At a fixed distance from the work station, there is located what is referred to as a measuring station. At or near the measuring station are located the motor for driving the carriage, a fraction drum, and an inch drum which cooperates with the fraction drum.

The carriage is provided with an elongated rack and the carriage motor is similarly provided with a spur gear which meshes with the rack to drive the same. Various control means are associated with the carriage motor for operating the latter in forward and reverse speeds and at slow speed in either direction. The carriage is also provided with a plurality of stops, referred to hereinafter as foot stops, located along the carriage at one foot intervals and which are engageable, on a predetermined and selected basis, with a corresponding inch stop on the inch drum as will hereinafter more fully appear.

The fraction drum is rotatably mounted above the carriage, but is axially immovable with respect to the work station. The inch drum is mounted on an inch drum support which is slidable relative to the fraction drum. A plurality of fraction cams of varying length (or terminating at varying distances from the work station) are mounted on the periphery of the fraction drum so as to represent the fraction-of-inch positions at which the carriage will be stopped ultimately. The fraction drum is rotated until the desired fraction cam is disposed upwardly and thereafter the inch drum support is retracted so that a stop on the inch drum support bears against the appropriate fraction cam.

The inch drum, which is provided similarly with inch cams will be rotated until the appropriate inch cam is disposed downwardly. When both the fraction drum and the inch drum have been moved to the correct position as called for by the control tape, this assembly is then in a position to be lowered so that the inch cam on the inch drum will intercept the appropriate foot stop on the carriage. However, this lowering operation will not occur until the carriage has been advanced to the correct foot or approximately to the correct foot.

After the two drums have reached their correct positions, but prior to the lowering of the inch drum, the carriage commences to move outwardly away from the work station until the foot called for by the control tape is reached. When the carriage reaches the correct foot, the carriage motor is immediately thrown into slow speed and simultaneously therewith or shortly thereafter, the inch drum drops downwardly and the carriage continues to advance at slow speed until the foot stop touches the inch cam to stop movement of the carriage.

In the meantime, one of the punches, as selected by the control tape, will have moved to a proper gauge position called for by the control tape. When both the carriage and the proper punching machine have stopped at their correct positions, but not until, a circuit will be energized to actuate the punching machine to punch a hole in the work piece.

The punching operation initiates the stepping of the control tape into its next position and the above operations are continued. After the completion of the required number of punching operations on a given work piece, the latter is discharged from the apparatus, the carriage is returned to its zero position, a new work piece is inserted, and the apparatus is ready to start another sequence of punching operations.

One of the novel features of the present invention involves the manner in which the two drums are rotated automatically. Each drum has associated therewith a set of positional relays. Each drum also has a set of demand relays which are equal in number to, and arranged oppositely with respect to, the positional relays. Both sets of relays for each drum are operated on a binary code basis. For example, the fraction drum will be able to provide movements of the carriage corresponding to $\frac{1}{16}$ of an inch and multiples thereof. The first relay in the set of demand relays, as well as in the set of corresponding positional relays will represent $\frac{1}{16}$ of an inch. The second relay in each set will represent $\frac{2}{16}$ of an inch; the third, $\frac{4}{16}$ of an inch; and the fourth, $\frac{8}{16}$ of an inch. It should be obvious that various combinations from $\frac{1}{16}$ to $\frac{15}{16}$ of an inch can be made by energizing various combinations of these relays. The demand relays will represent the position to which the associated drum should be turned and the positional relays will be energized to represent the position which the particular drum currently occupies. When the drum is moved to the position called for by the demand relays, the opposite relays in the positional set will be variously energized and deenergized so as to match those of the demand relays. An unmatched condition will call for rotation of the drum. When a matched condition is reached, rotation of the drum ceases immediately.

Another feature of the present invention involves the manner in which the inch drum is dropped, such that the inch cam will intercept the foot stop at the proper time. When it is desired to stop the carriage in the first part of a given foot, the slowing of the carriage motor and the dropping of the inch drum occur simultaneously. In the last part of a given foot, the slowing of the carriage motor occurs at a later relative time and the dropping of the inch drum may be even further delayed in certain instances. In order to accomplish the above, two sets of microswitches are provided at the measuring station. These microswitches are adapted to be actuated by a plurality of cams mounted on the side of the carriage, two such cams being provided for each foot of length of the carriage.

The electrical circuit which determines which set of microswitches are to control the stopping of the carriage is determined by the demand relays for the inch drum. When it is desired to stop the carriage in the first part of a given foot, the contacts on the demand relays are so interconnected that the set of microswitches which will be first contacted by the respective cams will be operative to slow down the carriage and drop the inch drum simultaneously. When the demand relays call for the stopping of the carriage in the latter part of a given foot, the contacts on the demand relays are such that the second set of microswitches become operative to slow the carriage and cause the dropping of the inch drum. However, the second set of microswitches are physically contacted at a later time than the first set of microswitches. As will hereinafter appear in connection with the detailed description of the drawings, for measurements of six, seven or eight inches in a given foot, the carriage will be slowed down at a later time, but the inch drum will drop simultaneously with the energization of the slow speed solenoid. The demand relays for the inch drum are such that if the measurement called for is nine, ten or eleven inches in a given foot, the inch drum will not drop until a certain time subsequent to the slowing down of the carriage.

The carriage itself is also provided with a set of positional relays and a set of demand relays. When the carriage has not advanced to the correct foot and there is an unmatched condition between the two sets of relays, the carriage will commence to move at a forward (high) speed providing the two drums have been first turned to their proper positions. However, when the carriage reaches the correct foot, it does not stop immediately but, rather, the slow speed solenoid is energized to slow down the forward advance of the carriage at which time (or shortly thereafter) the inch drum will drop. The actual stopping of the carriage does not occur until the foot stop makes physical contact with the inch cam on the inch drum.

The punching machines are provided with a set of positional relays and a set of demand relays. However, only one punching machine is connected into this electrical circuit at a given time. The demand relays and positional relays for the punching machine are similar to those broadly described above in that, when a matched condition is reached, the transverse movement of the punching machine will stop. Whereas, the carriage, for control purposes, is always moving in a single direction outwardly away from the work station, and whereas, the two drums can be rotated in a single rotary direction to achieve any condition called for, the punching machines, on the other hand, must be moved inwardly and outwardly. Heretofore it was thought necessary to move each punching machine outwardly for its maximum distance immediately subsequent to a punching operation so that it would be in proper position for the next punching operation, in which case it would merely be necessary to move the punch inwardly until the desired position was reached. However, one of the unique features of the electrical circuit for controlling the punching machines is that an instantaneous comparison can be made of the previous gauge position of the punching machine with respect to the demand position for that punching machine and, further, the required direction of movement of the punching machine can be determined. Thereafter the punching machine is moved inwardly or outwardly as determined by this position-sensing circuit until the positional relays match the demand relays at which time the movement of the punching apparatus ceases. Thus, it is unnecessary to return each punching machine to a given reference position following each punching operation.

There are many other novel features of the present invention which will hereinafter appear, but the above are presented on an introductory basis with the hope that it will facilitate a clearer understanding of the over-all invention.

With the above explanation in mind, it is an important object of this invention to provide a novel punch press apparatus for automatically selecting the positioning of holes for a work piece and punching the element in one over-all operation.

It is another object of this invention to provide a novel automatic punch press apparatus for punching holes in a work piece in response to the signals of a control means remote from the punch press machine.

Another object of this invention is to provide a novel automatic punch press apparatus actuated by a control means which may be programmed for punching a plurality of holes in a structural element in accordance with substantially any predetermined pattern.

A further object of this invention is to provide a novel automatic punch press apparatus wherein a plurality of structural elements may be quickly and efficiently punched with substantially an identical pattern for facilitating the final assembly of the punched elements.

Still another object of this invention is to provide a novel automatic punch press apparatus particularly designed and constructed for selecting the location of holes in both the longitudinal and transverse directions for punching thereof in a work piece.

A still further object of this invention is to provide a novel automatic punch press apparatus wherein the locating and punching of a plurality of holes in a structural element may be accomplished with great speed and accuracy.

It is still another object of this invention to provide an automatic punch press apparatus for punching holes in a plurality of structural elements whereby each structural element is automatically moved through the apparatus for being punched and released from the apparatus upon the completion of the punching operation.

It is a still further object of this invention to provide an automatic punch press apparatus wherein the punching machines are slidably mounted on the apparatus for punching holes in a structural element at substantially desired transverse dimension.

A still further object of this invention is to provide an automatic punch press apparatus having a control tape which may be programmed for actuation of the apparatus for punching substantially any desired pattern of holes on a structural element.

Another object of this invention is to provide an automatic punch press apparatus wherein a plurality or pattern of holes may be punched in both legs of an angle beam in one over-all operation.

A further object of this invention is to provide a novel punch press apparatus wherein a plurality of punching machines are provided for punching a plurality of leg members of a work piece during one passage of the work piece through the apparatus.

It is a still further object of this invention to provide a novel punch press apparatus having a pair of punching machines slidably mounted for movement at an angle of substantially forty-five degrees for reducing the force required for reciprocating the punch machines.

A still further object of this invention is to provide a novel automatic punch apparatus wherein the punching pattern for a work piece may be altered or readily changed for the punching of a new work piece having a different pattern requirement.

Another object of this invention is to provide a novel automatic punch press apparatus which efficiently and rapidly punches a pattern of holes in a work piece in an automatic manner which greatly reduces the number of workmen required, thus reducing the over-all expense of the operation.

Still another object of this invention is to provide a punch press apparatus having novel indexing means for controlling the advancing of the work piece through the apparatus and for controlling the pattern or arrangement of the holes punched therein.

Other objects of the present invention are to provide novel electrical circuits as set forth above to perform the operations set forth above and as described hereinafter in greater detail.

Other and further objects and advantageous features of the present invention will hereinafter more fully appear in connection with a detailed description of the drawings in which:

FIGURE 1 is a semi-diagrammatic front elevation of the entire punch press apparatus.

FIGURES 2A, 2B and 2C together constitute a front elevation of the entire punch press apparatus on a larger scale than that employed in FIGURE 1.

FIGURES 3A, 3B and 3C together constitute a plan view of the over-all punching apparatus on substantially the same scale as that shown in FIGURES 2A to 2C.

Figures 5, 6:
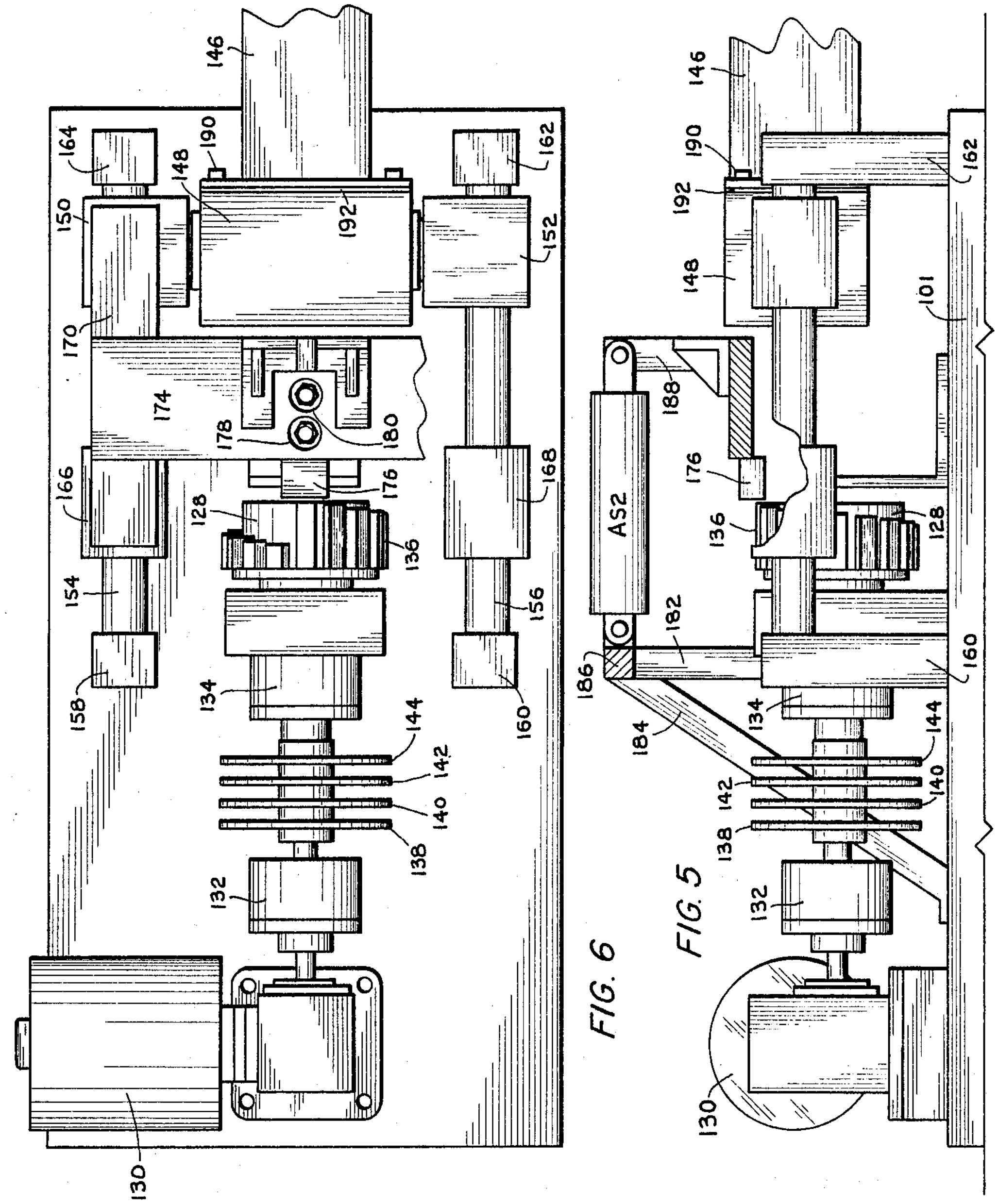
FIGURE 5 is a rear elevation with respect to FIGURE 2B, and on an enlarged scale, of the fraction drum and associated mechanism.
FIGURE 6 is a plan view of the structure shown in FIGURE 5.

FIGURES 8A to 8D, inclusive, represent the position cams for the fraction drum shown in FIGURES 5 and 6.

Figure 7:
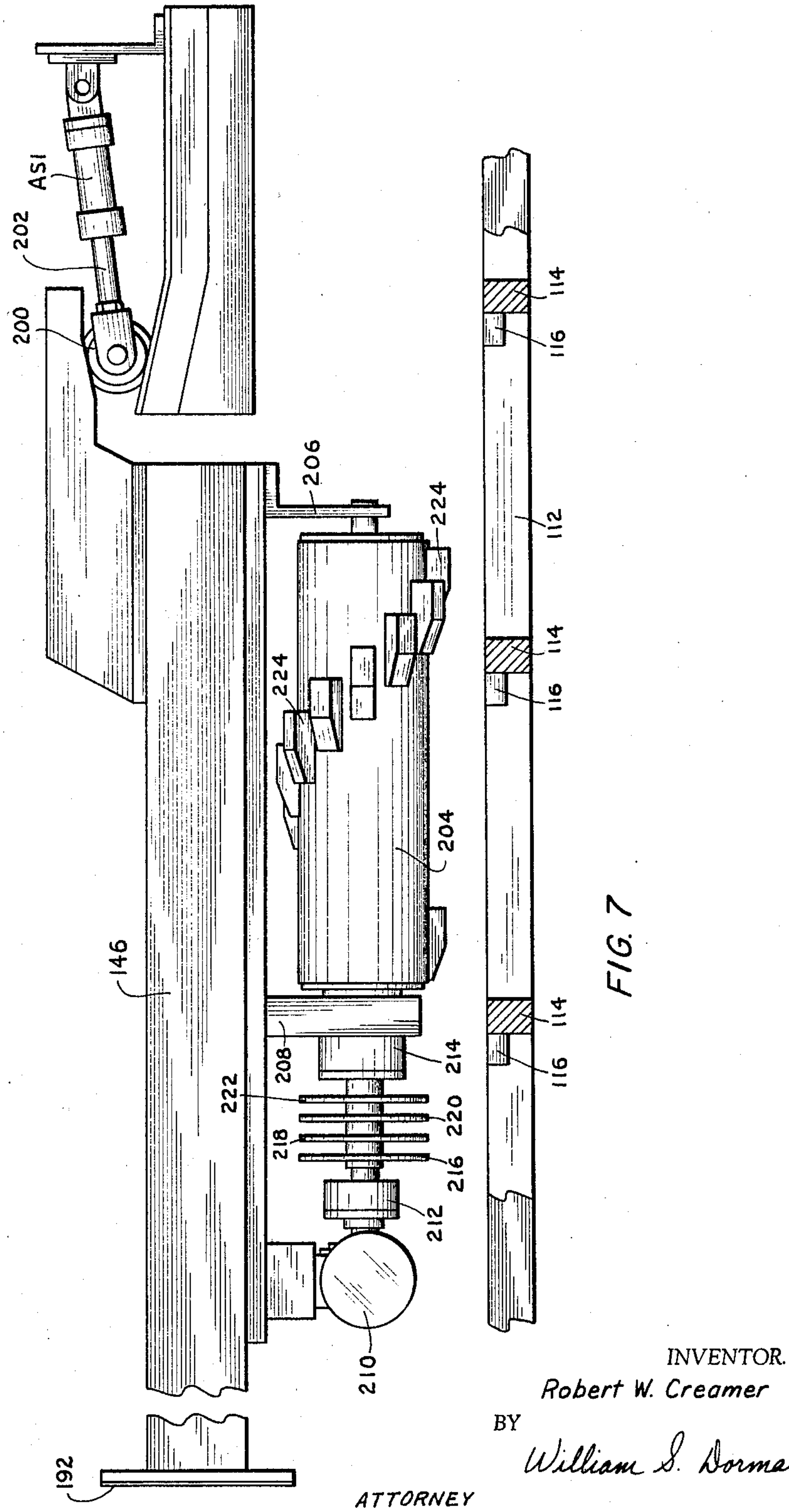
FIGURE 7 is a rear view of the inch drum and associated mechanism taken on the same scale as FIGURES 5 and 6.
Figure 8A:
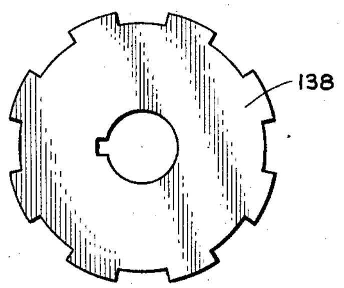
Figure 8B:
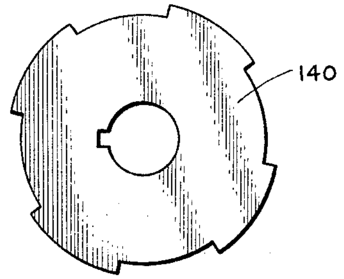
Figure 8C:
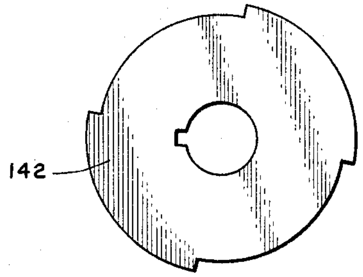
Figure 8D:
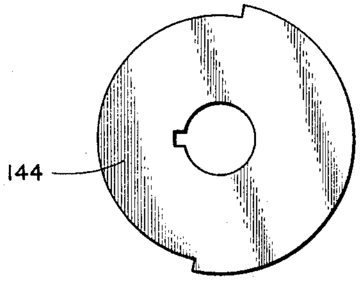
Figure 9A:
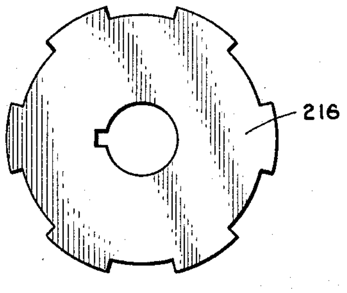
Figure 9B:
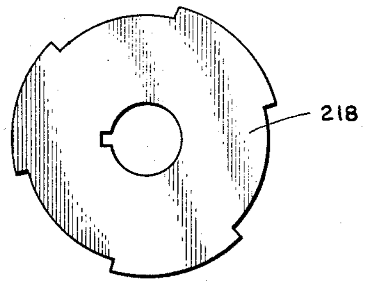
Figure 9C:
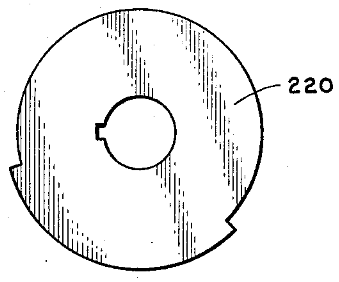
Figure 9D:
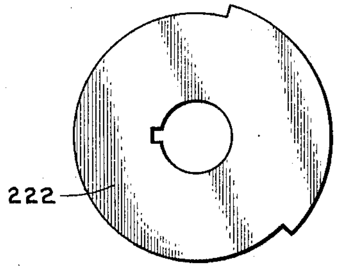

FIGURES 9A to 9D represent the position cams for the inch drum shown in FIGURE 7.

FIGURES 10A to 10E, inclusive, represent the electrical circuitry for operating the automatic punching apparatus of the present invention.

Figure 11:
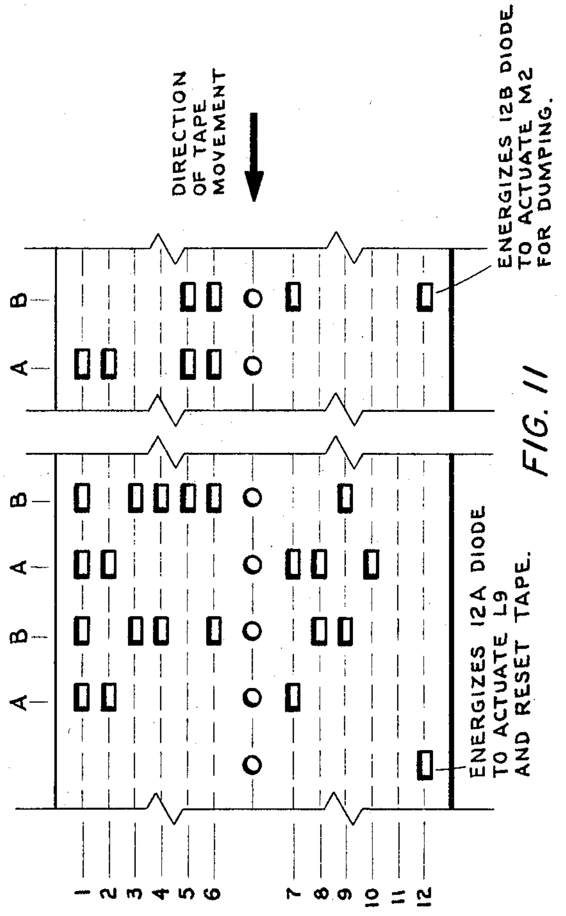

FIGURE 11 is a fragmentary view of a punched tape, showing particularly the initial and terminal portions thereof, employed in operating the electrical circuitry shown in FIGURES 10A to 10E.

Figure 12:
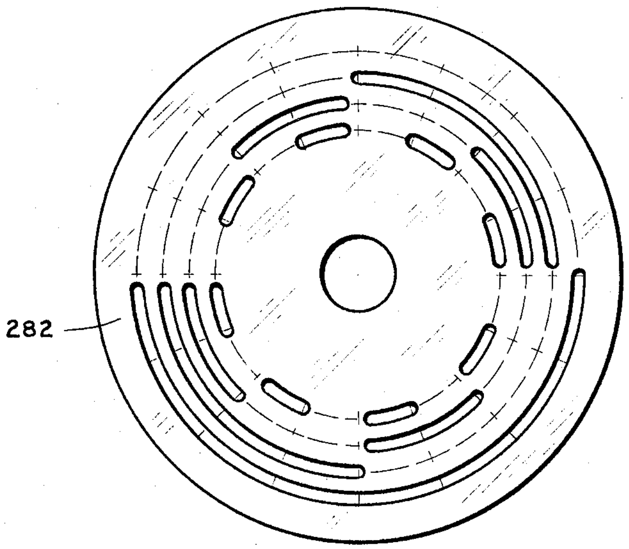

FIGURE 12 is an elevation of a fraction disc or cam which can be used, in accordance with one embodiment of the invention, for sensing and controlling the position of one of the punching machines.

Figure 13:
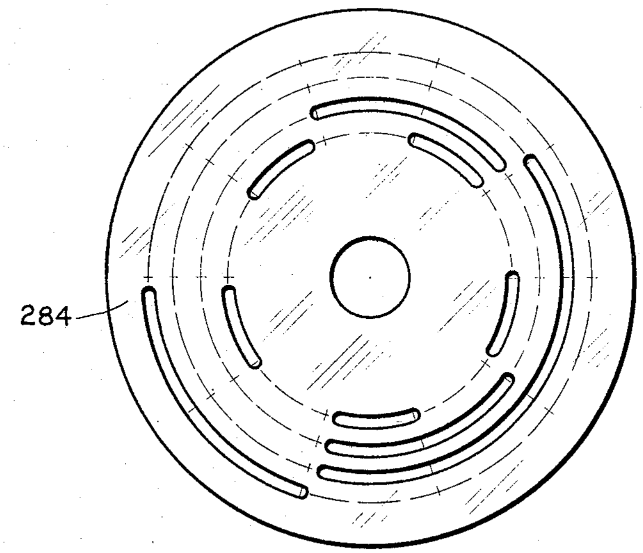

FIGURE 13 is an elevation of an inch disc or cam which is adapted to be used in conjunction with the disc or cam shown in FIGURE 12 for sensing and controlling the position of a punching machine.

Figure 10A:
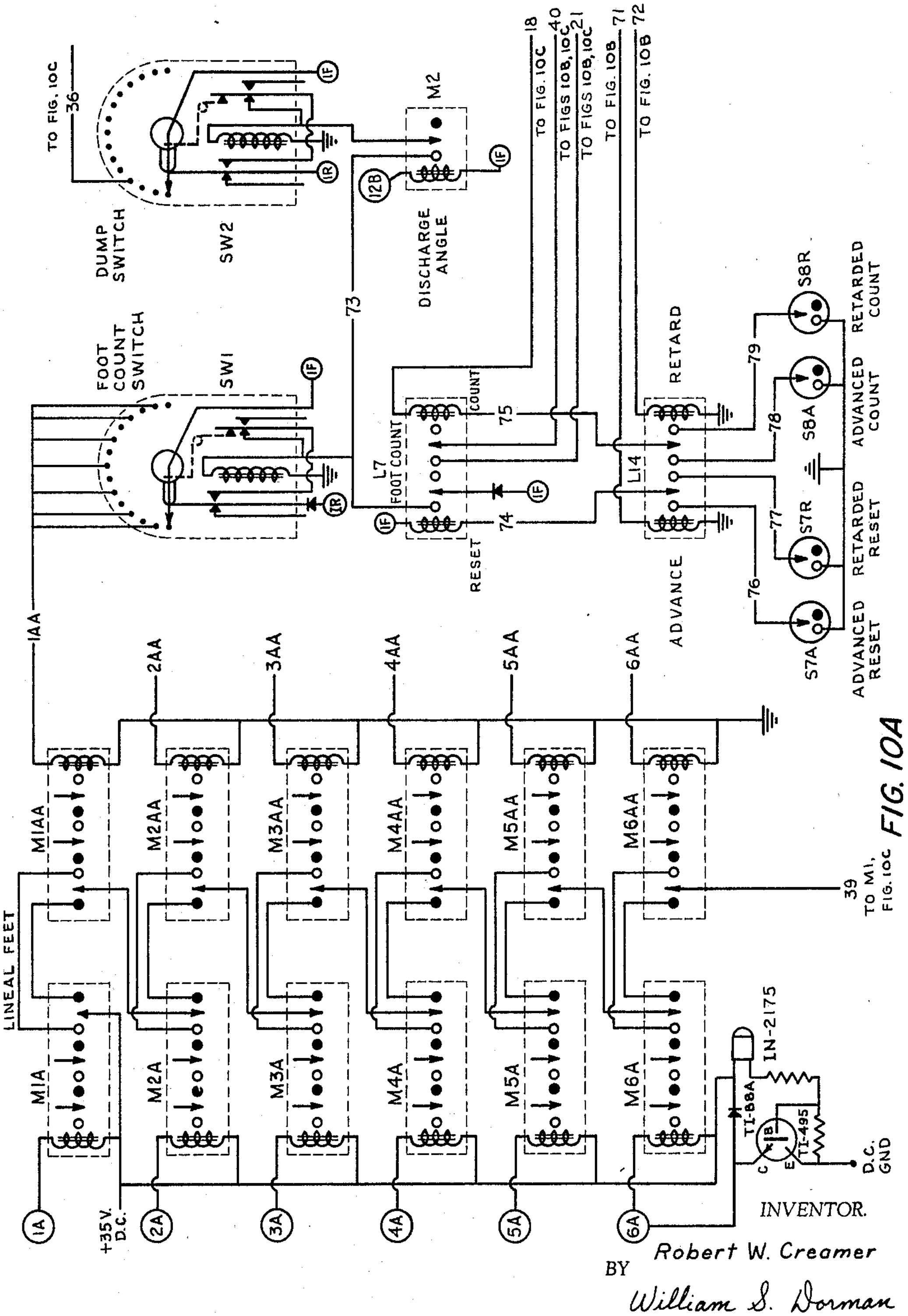
Figure 10B:
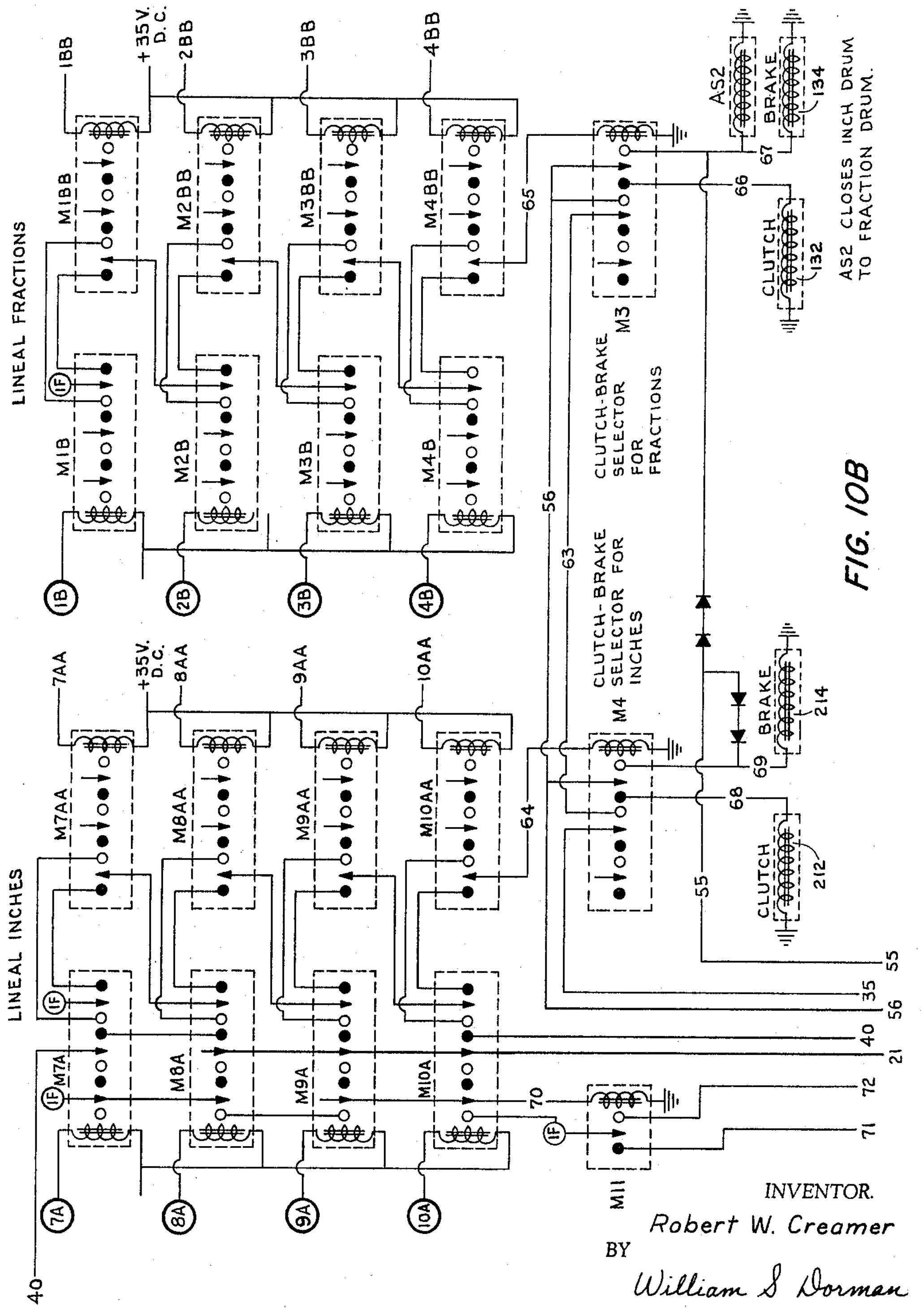
Figure 10C:
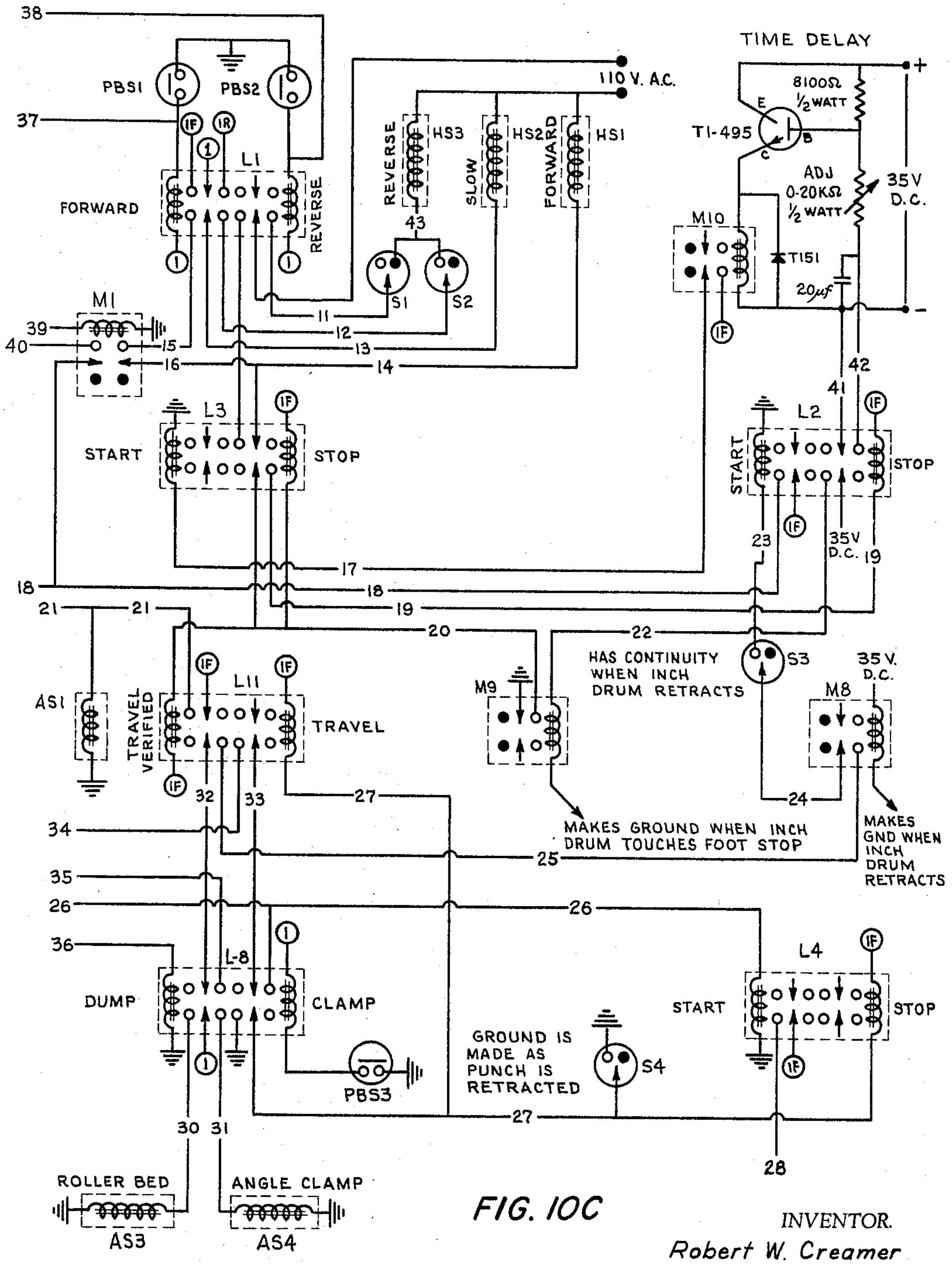
Figure 10D:
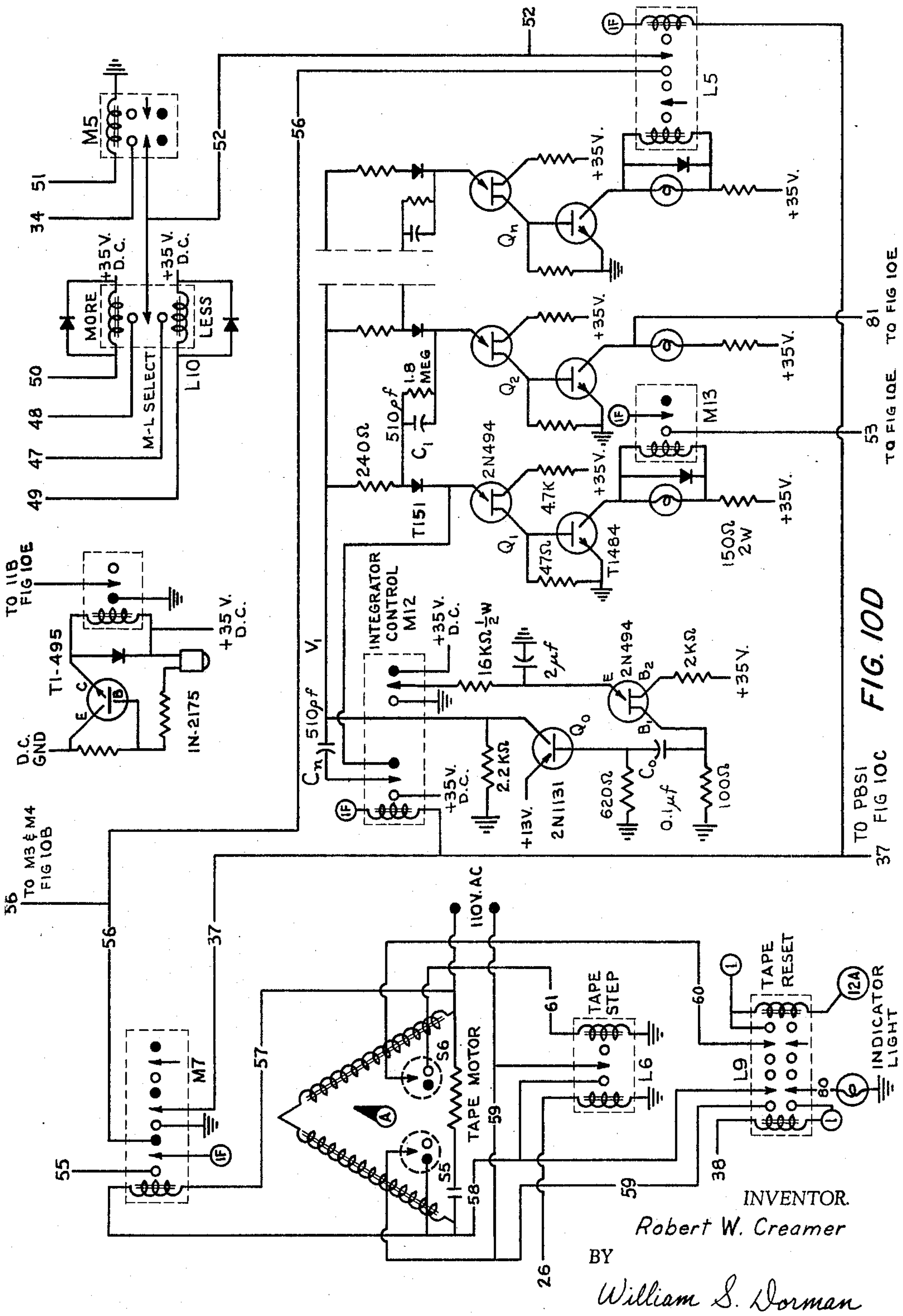
Figures 14, 14A:
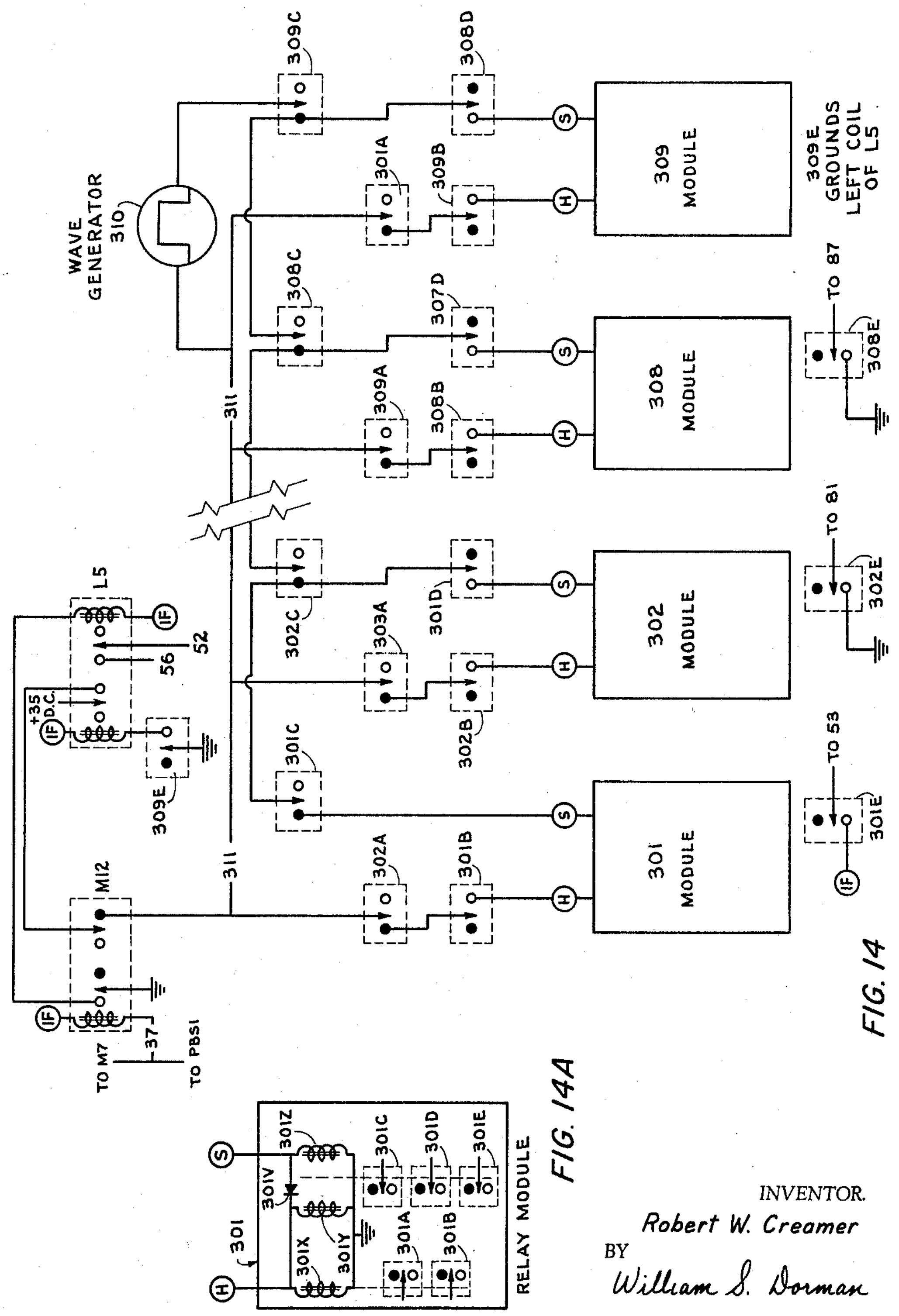

FIGURE 14 is an electrical circuit diagram of a modified form of the present invention wherein the transistorized integrator circuit shown in FIGURE 10D is replaced by a plurality of relays; and FIGURE 14A is a semi-diagrammatic view of one of the relay modules shown in FIGURE 14.

Referring to the drawings in detail, FIGURES 1 to 4 show a work station 100 and a measuring station 101 located at a fixed distance from the work station, the details of these stations being disclosed hereinafter. A longitudinally extending support means, which can be interrupted as desired, extends on opposite sides of the work station, the portion to the left of the work station 100 being designated by the reference character 102 in FIGURE 2A and the portion of the longitudinally extending support extending to the right of the work station being designated by the reference character 103. A substantially V-shaped trough 104 extends through the work station and is provided with a plurality of rollers 105 as best shown in FIGURE 3A. Since the over-all punching apparatus to be described herein is particularly designed in connection with the punching of an angle iron, such as the angle 106 shown in FIGURE 4, the supporting trough 104 is similarly shaped, whereas the rollers 105 are provided to facilitate the movement of the angle through the apparatus. Rollers, such as 105, can be provided anywhere along the length of the apparatus as desired. In fact, rollers are provided for the work piece adjacent the measuring station 101 and to the left of the support 102; however, the rollers are only shown in FIGURE 3A for the sake of simplicity.

At the work station there are located two punching machines 108 and 109 designated as left hand and right hand punching machines, respectively. The punching machines themselves are considered conventional and, hence, are not described in any detail, except insofar as is necessary consistent with the description of the present invention.

The upper portion of the support 103 constitutes a track 110 in which a longitudinally extending carriage 112 is slidably mounted. The carriage is provided with a plurality of transverse members 114 which are located approximately one foot apart for the entire length of the carriage. On each transverse member 114 there is located a stop 116. The stops 116 are exactly one foot apart and are adapted to be intercepted by a corresponding inch cam, later to be described, which is located on the outer periphery of an inch drum, later to be described. A plurality of cams 118 are located on the side of the carriade 112 for contacting certain microswitches as will be described hereinafter. One set of cams is provided for each foot of length of the carriage as will be set forth hereinafter in greater detail. The rear or trailing end of the carriage is provided with a clamp 120 which is adapted to be opened and closed by a solenoid designated by the reference character AS4. When the solenoid AS4 is energized, the clamp 120 can engage the for ward end of the work piece and draw the same through the work station 100 towards the measuring station 101.

Figure 1:
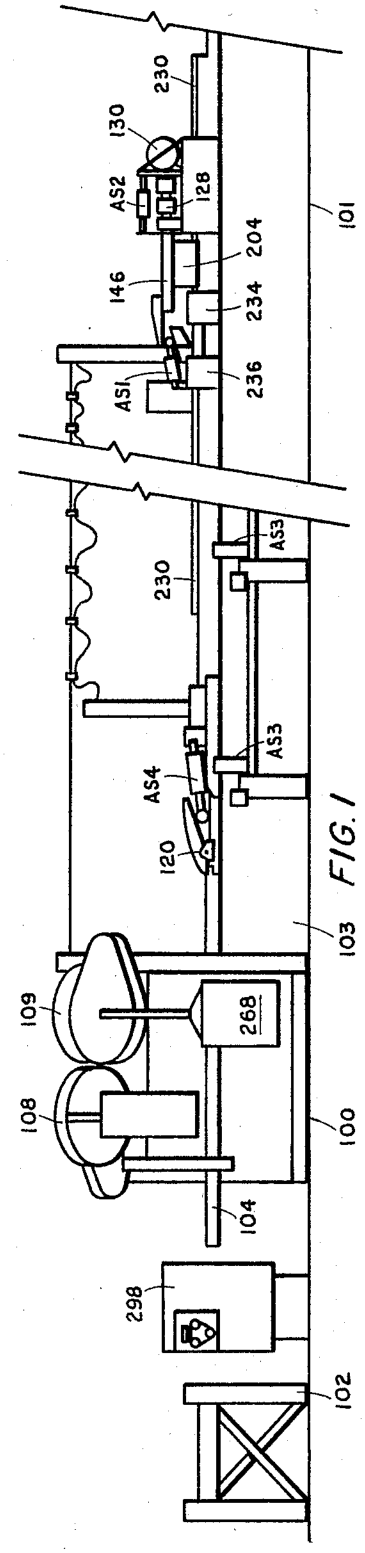
Figure 2A:
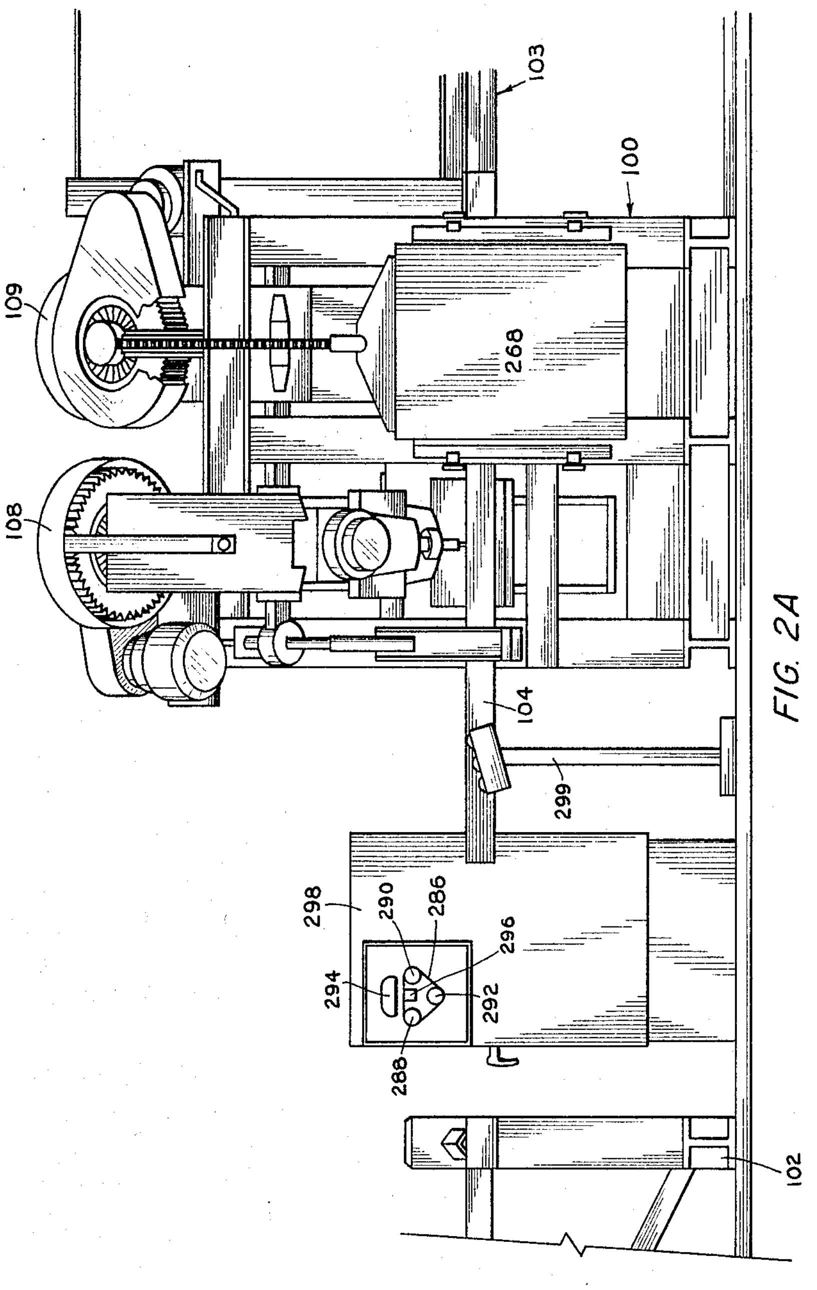
Figure 3B:
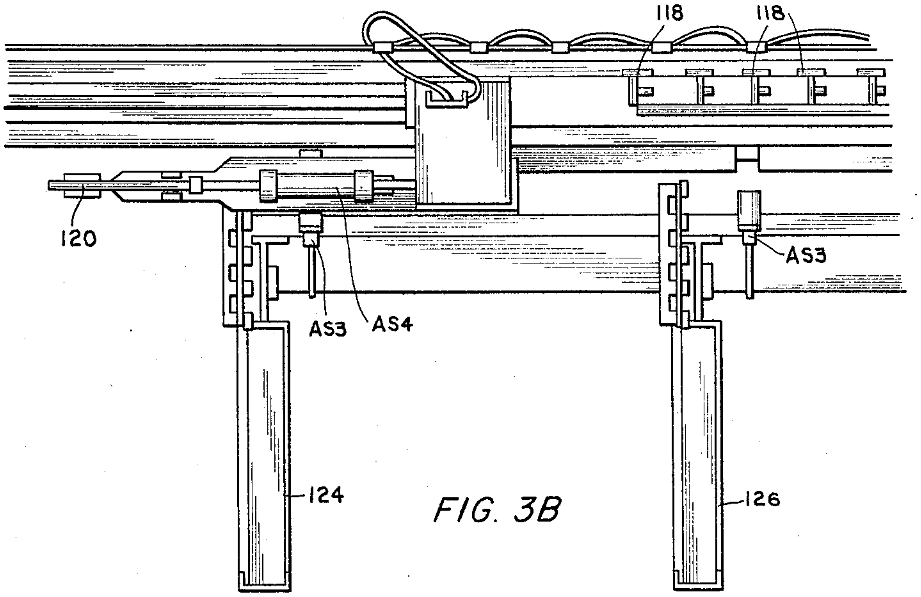
Figure 2B:
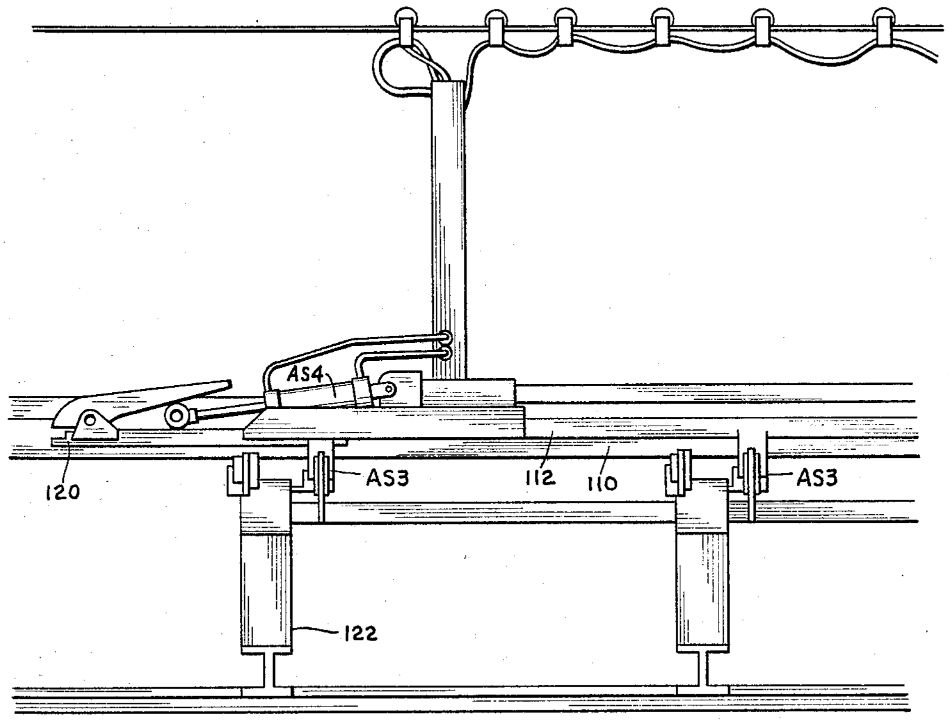
Figure 3C:
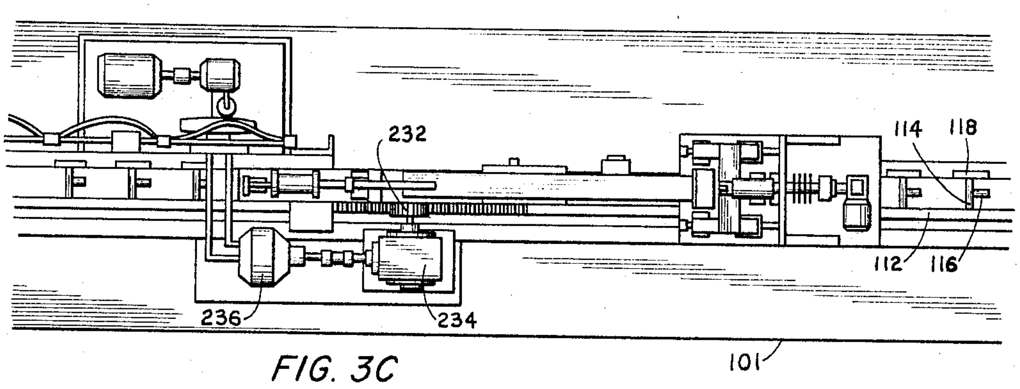
Figure 2C:
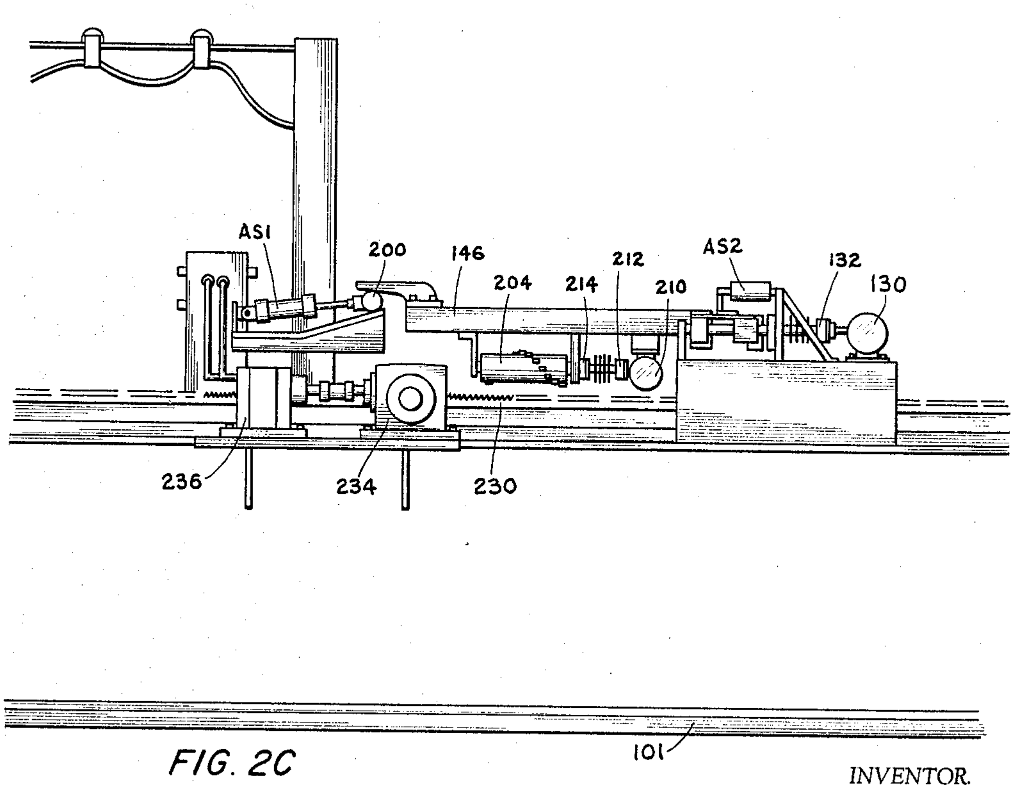
Figure 3A:
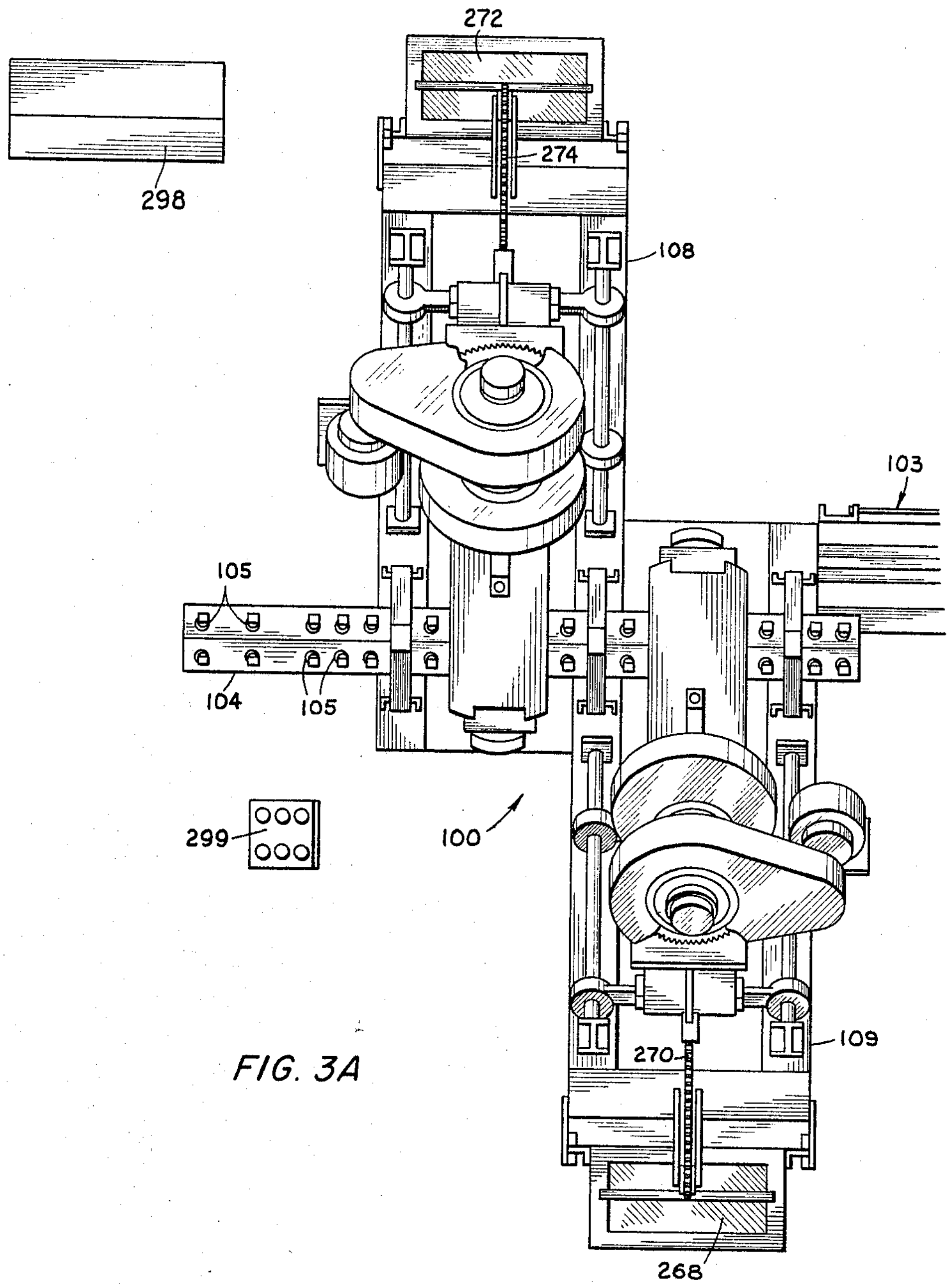

Between the work station 100 and the measuring station 101 there is located a discharge station 122. Briefly stated, the discharge station 122 includes a trough with rollers mounted thereon similar to that shown in FIGURE 3A. However, the right hand leg of the trough, or the foreground portion thereof as it appears in FIGURES 1 and 2B, is mounted pivotally with respect to the left hand leg thereof, such that it can be rotated radially downwardly with respect to the left hand leg to permit the discharge of a work piece from the supporting structure when the clamp 120 has been de-energized. The discharge station will not be described in greater detail, except to note that one or more solenoids designated by the reference character AS3 can be used to move the pivotal portion of the discharge station to the discharge position. The discharged work piece can then be supported, at least temporarily, on the cross members 124 and 126 or on a convenient work table (not shown).

Immediately above the measuring station there is located a fraction drum 128 driven by a motor 130 through a clutch mechanism 132 which is electrically energized, as will hereinafter appear, to transfer rotary motion of the motor 130 to the drum 128. An electric brake 134 is also mounted on the drive shaft for the drum 128 and is adapted when energized to immediately stop the rotary motion of the drum 128. The drum 128 has mounted on its periphery a plurality of longitudinally extending fraction cams 136. These cams are evenly spaced around the periphery of the drum 128 with each cam being $\frac{1}{16}$ of an inch longer or shorter, as the case may be, than the adjacent cam. There are sixteen such cams representing from zero to $\frac{15}{16}$ of an inch. The right hand ends of the cams as shown in FIGURES 5 and 6 are flat and these ends represent the variable $\frac{1}{16}$ distances to which the drum 128 can be turned. A plurality of circular cams 138, 140, 142 and 144 are shown as connected to the drive shaft for the drum 128. These cams are suitable profiled as shown in FIGURES 8A to 8D in such a manner as to cooperate with four microswitches (not shown) to indicate the exact position of the fraction drum 128.

A longitudinally slidable support 146 hereinafter referred to as the inch drum support is connected at one end to a pivotal member 148 which is suitably journalled in a pair of slidable blocks 150 and 152. The blocks 150 and 152 are slidably mounted on rods 154 and 156 which are held in position by uprights 158, 160, 162 and 164. Another pair of slidable blocks 166 and 168 are also mounted on the rods 154 and 156 for sliding movement together with the blocks 150 and 152. A longitudinally extending plate 170 is fixed to the upper ends of the blocks 150 and 166 to hold them a fixed distance apart and to permit movement of the two blocks as a unit. A plate similar to plate 170 is also connected between the blocks 152 and 168 for the same purpose; however, this longitudinal plate is not shown because certain parts are broken away for the sake of simplicity. A cross plate 174 extends from plate 170 and its opposite counter-part (not shown) and is fixedly secured thereto. Cross plate 174 is provided with a stop 176 whose longitudinal position may be adjusted by means of the bolts 178 and 180. A pair of uprights 182 (only one of which is shown in FIGURE 5) extend upwardly from the measuring station 101 adjacent the uprights 158 and 160. A pair of angular supports 184 (only one of which is shown in FIGURE 5) extend upwardly from the base of the measuring station 101 to the top of the uprights 182. A cross member 186 extends across the measuring station 101 above the uprights 158 and 160 between the junctions of members 182 and 184. An upwardly extending bracket 188 is provided on the cross plate 174. A solenoid AS2 is connected between the top of the vertical bracket 188 and the cross member 186. When this solenoid is energized, it will move the inch drum support such that the stop 176 is contacted with the appropriate fraction cam 136 on the fraction drum 128. The left hand end of the inch drum support 146 is bolted to the bearing member 148 by means of bolts 190. However, the members 146 and 148 are separated by a non-conductive sheet of material 192, such as cork, etc. The bolts 190 will also be non-conductive so as to insulate the member 146 electrically from the member 148 for a reason which will appear hereinafter.

As described above, one end of the inch drum support 146 is pivotally and slidably mounted by means of the bearing member 148 and the slidable blocks 150, 152, 166 and 168. The other end of the inch drum support 146 bears against a roller 200 which is rotatably mounted on the outer end of a rod 202, later to be described. An inch drum 204 is mounted for rotation on the inch drum support 146 by means of brackets 206 and 208 in which the drum is suitably journalled. A motor 210 is also mounted on the support 146 and is adapted to be placed in driving relation with the inch drum 204 by means of electrical clutch 212. An electric brake 214 is mounted on the drive shaft for the drum 204 in such a manner that it will stop the inch drum from rotating immediately upon energization of the brake. Four circular cams 216, 218, 220 and 222 are keyed to the drive shaft for the inch drum 204 so as to indicate, in combination with four microswitches (not shown), the exact rotational position of the inch drum 204.

A plurality of longitudinally extending inch cams 224 are mounted at evenly spaced intervals around the periphery of the inch drum 204. The right hand ends of these inch cams 224 are spaced successively one inch apart from each other, representing positions of zero to eleven inches. The shaft 202 is connected to the armature of solenoid AS1. When the latter is energized, the roller 200 will be moved to the right, as it appears in FIGURE 7, allowing the inch drum to drop downwardly such that one of the inch cams 224 will intercept one of the foot stops 116 on the carriage 112. The manner and sequence in which the last described operation occurs will appear more clearly hereinafter in connection with the description of the electrical circuitry.

The carriage 112 is provided with a rack portion 230 which meshes with a gear 232 mounted on the output shaft of a power take-off 234. The power take-off 234 is driven by a hydraulic motor 236 which can be rotated at high speed in forward and reverse directions and at slow speed in both of these directions in a manner later to be described in connection with an explanation of the electrical circuitry.

Figure 4:
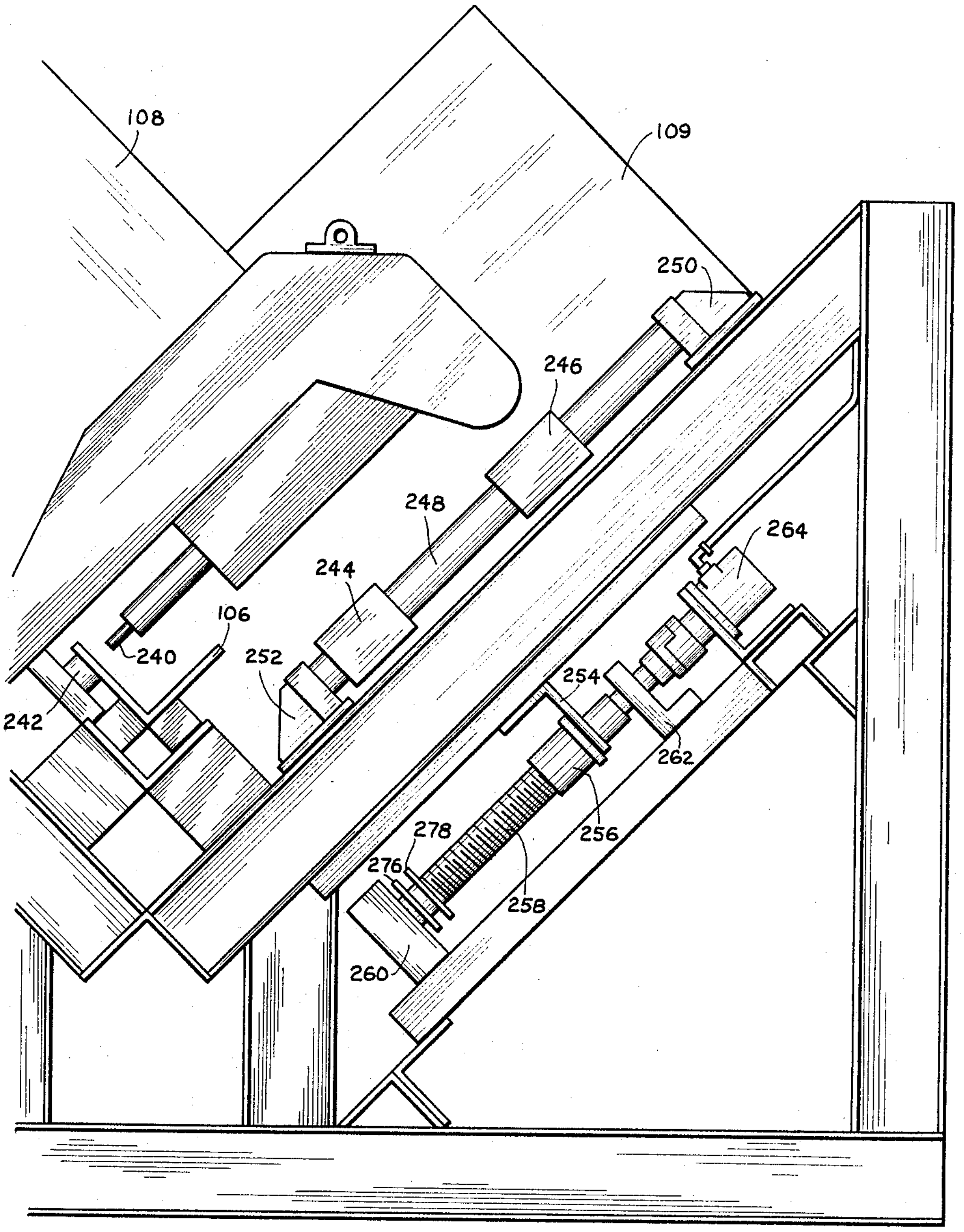
FIGURE 4 is a left hand end elevation of the punching apparatus with certain parts removed for the sake of simplicity.

FIGURE 4 shows certain of the details of the punching machines themselves. For example, the work piece or angle 106 is shown passing through a supporting structure which constitutes a continuation of the V-trough 104. The left hand punching machine 108 is shown having a male punching element 240 which cooperates with a female punching die 242 located on the opposite side of the work piece 106. When the mechanism of the left hand punching machine 108 is energized in a manner later to be described, the male punch 240 passes through the work piece 106 at the appropriate location and into the corresponding hole in the female die 242. The punching machine 109 is provided with a similar punching arrangement which is not shown for the sake of simplicity.

Since the punching machines 108 and 109 are quite massive and very heavy, the means for mounting these members, as well as the means for permitting sliding movement thereof, must be very sturdy and rugged. All of the details are not shown or described herein, but briefly stated, blocks 244 and 246 attached to the side of the punch 109 are slidable along a rod 248 which is secured at its ends 250 and 252 to the frame structure which supports the punches.

A bracket 254 is secured to the under side of the right hand punching machine 109. A ball nut 256 is fixed to the bracket 254. A ball screw 258 is mounted for rotation in the ball nut 256 and is journalled at its ends in supports 260 and 262 which are connected to the supporting structure for the punches. Hydraulic motor 264 is mounted in driving relation with the ball screw 258, such that rotation of the latter will cause movement of the punching machine 109 upwardly or downwardly along a forty-five degree angle. A suitable counterweight 268 of considerable size and mass is suspended at one side of the punch 109 and is connected thereto by means of a cable 270 to offset the weight of the punching machine 109 and to assist in the sliding movement thereof. A similar counterweight 272 is connected to the punching machine 108 by means of the cable 274 for the same purpose.

A pair of circular cams 276 and 278 are mounted adjacent the lower end of the ball screw 258 and are adapted in conjunction with a plurality of microswitches (not shown) to indicate the gauge position of the punching machine 109 in terms of sixteenths of an inch. Additional cams (not shown) appropriately geared to the shaft of the ball screw can be employed for indicating the gauge position of the punching machine 109 in terms of inches.

The description of the means for indicating the position of the ball screw 258 in FIGURE 4 has been defined in terms of circular cams and cooperating microswitches. However, the preferred embodiment of the invention involves two circular discs or cams, such as shown in FIGURES 12 and 13. A fraction cam designated by the reference character 282 is shown in FIGURE 12. A series of radially spaced and circumferentially extending slits are shown on the cam 282. In practice, one revolution of the ball screw 258 represents one quarter of an inch of movement of the punching machine 109. Therefore, since the cam 282, for one complete revolution, represents one inch of movement of the punching machine 109, it is necessary to use a four to one reduction between the shaft of the ball screw and the shaft (not shown) which drives the cam 282. It has been found that a twenty tooth gear (not shown) attached to the end of the ball screw 258 when meshing with an eighty tooth gear (not shown) mounted on the shaft (not shown) for the cam 282 will provide the correct angular relationship between this cam and the movement of the ball screw. A light source will be placed on one side of the cam 282 and a bank of photo-diodes (not shown) consisting of four diodes will be placed on the opposite side of the cam from the light source in radial positions corresponding to the locations of the slits.

FIGURE 13 shows an inch disc or cam designated by the reference character 284. This is similar to the cam 282 previously described, but is designed for indicating and controlling the movement of the punching machine in terms of inches. The inch indication of cam 284 plus the fractional indication of cam 282 together will provide the total indication of the position of one of the punching machines. Cam 284 is similarly provided with radially spaced and circumferentially extending slits. However, cam 284 is arranged to provide ten different indications from zero to nine inches of movement of the punching machine. A light source (not shown) will be placed on one side of the cam and a bank of diodes (not shown) consisting of four diodes will be placed on the opposite side of the cam from the light source in radial positions corresponding to the locations of the slits. It remains merely to mount the cam 284 on a shaft (not shown) which will be driven at a ten to one reduction from the shaft (not shown) for the cam 282 or on a forty to one reduction from the shaft of the ball screw.

The means for indicating the positions of the inch and fraction drums has been described above in connection with circular cams mounted on the drive shafts for these drums and cooperating microswitches (not shown) which will bear against the outer peripheries of these cams. However, it is preferred to use discs or cams such as those shown in FIGURES 12 and 13 for indicating and controlling the positions of the inch and fraction drums. A cam such as that shown in FIGURE 12 can be placed directly on the drive shaft for the fraction drum 128 with a light source and a bank of diodes being disposed on opposite sides thereof as described above.

In connection with the inch drum 204, a cam similar to that shown in FIGURE 13 can be employed; however, instead of using a ten position cam it would be necessary to use a twelve position cam, since one revolution of the drum 204 represents a complete foot of movement. A light source and bank of diodes will be disposed on opposite sides of this cam for the inch drum in the same manner as described above.

The movement of the punching mechanism to different gauge positions has been described above in connection with the movement of the entire punching machine. However, it is contemplated that movement of the entire machine can be avoided by making the die set thereon movable to the gauge position desired. Such a modification falls within the purview of the present invention.

The tape, which is shown in FIGURE 11 and which is described hereinafter in connection with the electrical description, is designated by the reference character 286 in FIGURE 2A. The tape 286 passes around a pair of sprockets 288 and 290, one or both of which may be driven. A freely mounted roller 292 is supported by the tape within the lower loop thereof to keep the tape taut. A light source generally indicated by the reference character 294 can be mounted above the tape and a bank of diodes generally indicated by the reference character 296 can be located below the tape in a position opposite from the light source. As will hereinafter more fully appear in connection with a description of the electrical circuit, various of the photo-diodes in the bank of diodes 296 will be energized by the light source 294, depending upon the position of the holes in the tape. The tape and associated mechanism can be mounted in a suitable housing 298 located in a position convenient to the over-all apparatus. A pedestal 299, the details of which are merely shown in a general nature, is also preferably located near the punching apparatus. This pedestal will preferably include the push buttons later to be described which are used for operating the over-all punching apparatus.

OPERATION

The operation of the present invention will be described in particular relation to the over-all electrical circuit which is shown in FIGURES 10A through 10E.

Before commencing with the specific description of the electrical circuit, it should be pointed out that a conventional power supply (not shown) is provided giving the various A.C., D.C. voltages shown on the drawings. The reference numeral 1 wherever it appears indicates 110 volts D.C. The reference character 1F means 110 volts D.C. for the "forward" condition of travel of the carriage and is provided when the "forward" coil of relay L1 is actuated. The reference character 1R represents 110 volts D.C. for the "reverse" condition of travel for the carriage and is provided when the "reverse" coil of L1 is energized.

Broadly speaking, there are two generally different types of relays employed in the electrical circuit, and these are momentary relays and latching relays. The momentary relays have reference characters prefixed by the letter "M," whereas the latching relays are correspondingly prefixed by the letter "L." In all of the relays, the arrows represent the movable contacts of the relays, whereas the circles represent the stationary contacts. In the momentary relays, the black circles represent the contacts against which the movable contacts will normally rest when the momentary relays are de-energized. With regard to the latching relays, the movable contacts will remain over to that side which was last energized.

It will be assumed now that the carriage has been returned to its starting position (although the return of the carriage will be described hereinafter in connection with actuation of push button PBS 2). It will be further assumed that the tape has been reset. At this point, the operator places a work piece (angle iron, for example) on the work holder 102, thereafter sliding the work piece over the rollers 105 through the spaces between the two punches 108 and 109 until the forward end of the work-piece engages the clamp 120. Now, the operator depresses the clamp push button PBS 3 so as to energize the "clamp" coil of the latching relay L8. All of the movable contacts of the relay L8 are moved to the right making certain connections and breaking others as will be described hereinafter at appropriate portions of this description. The "angle clamp" solenoid AS4 is energized to hold the clamp firmly against the forward end of the work piece.

Now, the operator pushes the "forward" button PBS 1 so as to energize the "forward" coil of L1, thereby creating 1F by means of this relay and temporarily grounding line 37 for a reason which will appear hereinafter in connection with the description of the integrator circuit. With 1F being produced by the relay L1, 110 volts D.C. passes through the left hand side of relay M7 into line 56 (FIGURE 10D) and through the normally closed contacts of M3 and M4 (FIGURE 10B) to energize the clutches 132 and 212 of the fraction drum and the inch drum, respectively (assuming that movement is required for both drums). When the two clutches are energized, the fraction drum and the inch drum will both start turning and will continue to do so until the position of each drum "matches" the information fed to the circuit which controls its turning. For example, with respect to the circuit labeled "lineal fractions," the information fed into the positional relays M1BB to M4BB, inclusive, from lines 1BB to 4BB, inclusive, respectively, represents the actual physical position of the fraction drum as provided by certain cam actuated microswitches or photo-electric diodes feeding information into the right hand coils of M1BB to M4BB on a binary system basis depending upon the physical position of the drum. The left hand or demand relays M1B to M4B, inclusive, are provided with demand information from the tape, as will hereinafter appear, from lines 1B to 4B, inclusive, respectively, also on a binary system basis. The fraction drum is calibrated on the basis of 16ths of an inch, such that lines 1B, 2B, 3B and 4B represent $\frac{1}{16}$, $\frac{2}{16}$, $\frac{4}{16}$ and $\frac{8}{16}$ respectively; the same considerations hold true for corresponding lines 1BB to 4BB, respectively.

It will be assumed that the fraction drum should be turned to a position corresponding to $\frac{13}{16}$, therefore relays M1B, M3B and M4B will be energized. The fraction drum should therefore turn until relays M1BB, M3BB and M4BB are energized so as to "match" the opposing left hand relays. When this matched condition is reached, 1F will pass from the right hand movable contact of M1B to the normally open right hand contact of M1B to the normally open left hand contact of M1BB through the movable left hand contact of M1BB to the right hand movable contact of M2B into the normally closed right hand contact of M2B into the normally closed left hand contact of M2BB and so on energizing line 65 to energize M3. When M3 is energized, the clutch 132 for the fraction drum is de-energized, the fraction drum brake 134 is energized and the solenoid AS2 is also energized. The solenoid AS2 moves the inch drum support back into position against the corresponding stop on the fraction drum. Movement of the inch drum support closes normally open switch S3 and energizes relay M8 (FIGURE 10C).

The "lineal inches" circuit is similar to, but somewhat more complicated than, the lineal fractions circuit described above. The lineal inches will be described hereinafter in greater detail, but, for the moment, it will be assumed that the information fed into demand relays M7A to M10A, inclusive, matches the positional information of positional relays M7AA to M10AA, inclusive, such that M4 will be energized. When M4 is energized, the clutch 212 for the inch drum is de-energized and its brake solenoid 214 is energized. With M3 and M4 both energized, line 56 has continuity through these relays and line 63 to line 35, thereby providing an interlock which will prevent the carriage from moving until both the inch drum and the fraction drum have come to rest in their proper positions. Line 35 (see now FIGURE 10C) connects through relay L8 and line 32 to L11, from L11 through line 25 to M8, from M8 through line 24 to S3, from S3 through line 23 to the "start" coil of L2; therefore 110 volts is applied to the start coil of L2 so as to energize the same.

When L2 becomes energized, the 20 microfarad condenser in the time delay circuit is unshorted and now commences to charge through the 35 volt D.C. input raising the bias on transistor TI 495 until the latter conducts to energize relay M10. The charging of the capacitor, as described above, provides about 1/10 of a second delay in energizing the relay M10 after the "start" coil of L2 is energized. There is a definite reason for providing the time delay; if the carriage is "in" the correct foot, sufficient time should be given for the inch drum and the fraction drum to turn to their correct positions and to drop, or to be in condition ready to drop, before the carriage commences moving. As long as the delay is sufficient to permit the accomplishment of the above, the indicated time of about 1/10 of a second is not at all critical. In fact, the delay can be varied above or below this value by adjusting the variable resistor shown in the time delay circuit or by adding other resistors, variable or otherwise, in the circuit where desired.

As soon as M10 is energized, 110 volts A.C. is applied through line 17 to the "start" coil of L3. As soon as the start coil of L3 is energized, continuity is provided from the 110 volt A.C. source (shown above solenoids HS1 to HS3) through the contacts of relay L1 and L3 to line 14 and hence to the "forward" solenoid HS1. At this point, the carriage commences to move at (full) forward speed (assuming that the carriage is not in the correct foot).

When the carriage reaches the correct foot, such that the demand information fed into demand relays M1A to M6A, inclusive, matches the positional information fed into positional relays M1AA to M6AA, inclusive, respectively, 35 volts D.C. will be supplied through the top of the relays continuously to the bottom thereof to the line 39. Line 39 continues into FIGURE 10C to energize the relay M1 so as to provide continuity between lines 15 and 16, thereby immediately energizing the "slow" solenoid HS2 so as to slow down the movement of the carriage almost instantaneously, as will be described below.

What happens after the carriage is thrown into the "slow" movement depends upon whether the inch drum calls for a dimension of (a) less than six inches or (b) six inches and over.

*Less than six inches*

If the lineal inches requirement is less than six inches, M10A cannot be energized nor can M8A and M9A be energized simultaneously; the relay M11 will not be energized and 1F will be supplied through the normally closed contact of M11 to the "advance" side of relay L14, thereby placing line 74 in communication with line 76 and line 75 in communication with line 78.

The foot count switch SW1 is one of six ganged switches connected to 1AA to 6AA, respectively. However, only SW1 is shown for the sake of simplicity since the remaining switches SW2 to SW6 (not shown), inclusive, would be connected in similar manner to lines 2AA to 6AA, respectively. SW1 is connected as the first of a binary system; SW2 (not shown) would be connected for the second of the binary system and so forth. The coil which is shown in SW1 will energize all six ganged switches simultaneously such that this coil will cause the switches to step after the coil is de-energized; that is, the switch cocks when it is energized and will step thereafter upon being de-energized.

Switches S7A and S8A (as well as switches S7R and S8R) are mounted on the side of the base support for the drums in position to be contacted by cams 118 on the carriage. For each foot on the carriage, one cam of suitable length is provided for the reset microswitches and another cam is provided for the count microswitches. Reset switches S7A and S7R will be contacted before count switches S8A and S8R. Advanced switches S7A and S8A will be contacted before retarded switches S7R and S8R, respectively. Advanced count switch S8A is so positioned with respect to its cam that this switch is energized approximately four inches before the carriage reaches the corresponding foot which is counted by this switch. It has been found, as far as the particular apparatus of the present invention is concerned, that the physical size and characteristics of the machine are such that the minimum movement of the carriage from the beginning of slow to stop position is about four inches. On the other hand, it is possible, for punching machines of different sizes and different physical characteristics, that a travel allowance of more, or less, than four inches might be required. The retarded count switch S8R is located at or just beyond the corresponding foot position so that it cannot be energized by the corresponding cam for any punching operation occurring in the latter part of the preceding foot.

Returning now to the original assumption that the inch drum is set for less than six inches, when the reset cam strikes S7A, the "reset" coil of L7 will be energized so as to place 1F on the coil of SW1. After the reset cam passes by S7A so as to de-energize the same, the count cam will shortly thereafter contact S8A to energize the "count" coil of L7, taking 1F off the coil SW1 causing the latter to advance one step, thereby introducing 1F through the next set of contacts of switches SW1 to SW6. Assuming that this is the correct foot, M1A to M6A will "match" with M1AA to M6AA, respectively, to place 35 volts D.C. on line 39. As indicated heretofore, when line 39 becomes "hot," M1 is energized to throw the carriage immediately into the "slow" condition of travel. At the same time, another set of contacts are closed through M1; that is, line 18 is placed in communication with line 40, but line 18 is also connected to 1F since the "start" coil of L2 has been energized heretofore. Since the inch drum calls for less than six inches, relay M10A will be de-energized such that line 40 will connect with line 21 through the center reed of M10A. Therefore, 1F passes into line 21 to AS1 (FIGURE 10C), dropping the inch drum into the path of movement of the foot stops on the carriage. The carriage will continue to move under slow speed until the inch drum touches the interposed foot stop to energize M9.

As soon as M9 is energized, the "travel verified" coil of L11 is energized to insure continuous 1F on solenoid AS1 for holding the drum down. When M9 is energized, the "stop" coil of travel relay L3 is also energized to break continuity between line 14 and the 110 volt A.C. source, thereby de-energizing forward solenoid HS1 and slow solenoid HS2. At the same time, energizing the "stop" coil of L3 will energize the "stop" coil of L2 to short out the capacitor of the time delay circuit and de-energize M10. When M10 is de-energized, the "start" coil of relay L3 is de-energized while the "stop" coil of the same relay remains energized.

Returning to L11 again for a moment, when the "travel verified" coil of this relay is energized, the circuit between line 35 and line 25 is broken so as to prevent the "start" coil of L2 from being re-energized thereafter.

*Six inches or more*

Before going to the punching circuit, let us assume that the inch drum calls for six inches or more. The fraction drum and the inch drum will turn as before to their proper positions and power will go to the "forward" solenoid HS1 in the same manner as before. In the interim, however, if the lineal inches circuit calls for six, seven, eight or more, 1F will energize M11 through line 70 placing 1F on line 72 and the "retard" coil of L14. When the carriage takes off moving in the (full) forward speed nothing will happen when the cams contact S7A and S8A. However, when the first cam contacts S7R, the "reset" coil of L7 is energized to energize the coil of the foot count switches SW1 to SW6. Thereafter, when the second cam contacts S8R, the "count" side of L7 is energized so as to de-energize the coil of SW1 so as to step the latter, and so on, until the carriage is "in" the correct foot, at which time line 39 becomes "hot" to energize M1 and throw the carriage into "slow" speed. If the measurement called for is six or seven inches, line 40 will connect with line 21 through the center reed of M10A as before so as to energize solenoid AS1, dropping the inch drum immediately into the path of the oncoming foot stop. If the measurement called for is exactly eight inches, line 40 will connect with line 21 through the contacts of M7A and M8A causing the inch drum to drop immediately. However, if the measurement called for is nine, ten or eleven inches, there is no continuity between 40 and 21 through relays M7A to M10A, inclusive, and this continuity will not be provided until the next reset cam hits switch S7R to energize the "reset" side of L7 and provide continuity between lines 40 and 21 through L7. Thus, it will appear that for measurements of six, seven and eight inches, the carriage will be thrown into "slow" speed at a later time and that for measurements of nine, ten and eleven inches, there will be an even further delay in the dropping of the inch drum.

The reason for the last mentioned delay can be briefly explained as follows: assume that the last measurement was one foot, one inch and it was desired to advance to one foot, eleven inches; the line 39 will be "hot" because the carriage is still in the correct foot. However, if the inch drum were dropped now, the eleven inch cam on the inch drum might hit the zero foot stop because the inch drum in the meantime would have turned to where the eleven inch cam was downwardly disposed in position to intercept the one foot stop upon further advance of the carriage; in other words, the eleven inch cam or stop on the inch drum might ground against the zero foot stop before the carriage could commence to move, even under slow speed. If the eleven inch cam, should touch the zero foot stop, a current would pass through M9 to stop the carriage or prevent its movement, thereby indicating that the correct position had been reached when, in fact, it had not. By causing the solenoid AS1 to be energized at a later time, the above condition is prevented and the carriage will always stop in the correct position.

*Gauge circuits*

Before punching a hole in the web of the angle (work piece), it is necessary that the punch be positioned correctly in two respects; (a) the punch must be disposed at the proper distance from one end of the work piece; and (b) the punch must be properly positioned transversely from the apex of the angle. As far as the (a) position is concerned, this has been described above in connection with the movement of the inch and fraction drums and the stopping of the carriage at the proper position. As far as the (b) position is concerned, this will be referred to as the "gauge" position or condition of the punch, and the description of the circuits employed for positioning the punch in this sense will be described below.

Previously it was indicated that line 37 is temporarily grounded when PBS 1 is depressed. Turning now to FIGURE 10D, the grounding of line 37 will serve two functions. First of all, the right hand coil of L5 will be energized to disconnect line 52 from line 56. Secondly, the coil of the integrator control relay M12 will be energized, moving the contacts thereof to the left. When M12 is energized, 35 volts D.C. is imposed upon capacitor $C_n$ and, at the same time, the 16K resistor in the emitter circuit of the oscillator transistor is grounded, thereby preventing the oscillator transistor from conducting. As will hereinafter more fully appear, whenever the oscillator transistor conducts, $Q_0$ is extinguished. When the oscillator turns off, $Q_0$ conducts.

When $Q_0$ is conducting, the output voltage at $V_1$ will be 13 volts. At the moment that M12 is energized, therefore, the charge across the capacitor $C_n$ is 35 minus 13 or 22 volts. When M12 is de-energized (when the operator releases pressure from PBS 1), $C_n$ discharges through the left hand normally closed contacts of M12 impressing a charge of 22 volts on the emitter of $Q_1$ causing the latter to conduct.

When $Q_1$ conducts, the voltage at its emitter drops to 4 volts. The voltage on the lower side of $C_1$ is 13 volts, such that when $Q_1$ conducts, $C_1$ will thereafter charge up 9 volts.

During the period of time that the capacitor $C_n$ is causing or has caused the transistor $Q_1$ to fire, the 2 microfarad capacitor in the emitter circuit of the oscillator transistor is charged up through the 16K resistor from the 35 volt D.C. source. The bias on the emitter of the oscillator transistor increases until this transistor fires. When this oscillator conducts, it puts a pulse through $C_0$ cutting off $Q_0$, thereby removing $V_1$. When $V_1$ drops to zero, $Q_1$ is extinguished. Shortly thereafter, the oscillator extinguishes itself, $Q_0$ conducts and $V_1$ returns to 13 volts. This 13 volts plus the 9 volt charge on capacitor $C_1$ will cause $Q_2$ to fire.

The sequence continues on from the first transistor $Q_1$ to the last transistor $Q_n$. Whenever $Q_0$ is extinguished by the oscillator transistor, this will have the effect of cutting off the "on" transistor. When $Q_0$ conducts thereafter, this has the effect of turning on the next transistor in the series.

After $Q_n$ is extinguished, the integrator circuit will not go on again until M12 is energized. The oscillator transistor will turn $Q_0$ on and off but this will not be sufficient to fire $Q_1$ until $C_n$ is charged up by the actuation of M12.

When $Q_1$ is energized, M13 is energized to place 1F on line 53. Line 53 connects with the bottom half of the right hand coils of L8B to L11B and L5B to L7B, inclusive, so as to "clear" these latching relays. The path to ground from line 54 is through any one of the connections 8B to 11B or 5B to 7B as shown, for example, in the photo-diode circuit connected to 11B. Any similar photo-diode which was energized would provide a ground for line 54 so as to clear the latching relays as set forth above.

Transistors $Q_1$ to $Q_n$, inclusive, are uni-junction transistors which are fired in sequence in the manner described above. Each uni-junction transistor has associated therewith a transistor of the type designated as TI 484 which conducts as soon as the uni-junction conducts. The relay M13 is actually in the collector circuit for the TI 484 transistor associated with $Q_1$. As far as $Q_2$ to $Q_n$ is concerned, these are employed, as will be described hereinafter in greater detail, for actuating the more-less relay L10. $Q_2$, through its associated TI 484 transistor, provides a path of current through the line 81 to either the "less" coil or the "more" coil of L10. Transistors $Q_3$ to $Q_8$ inclusive (not shown) would be connected to points 82 to 87, inclusive, on relays L9B to L11B and L5B to L7B, inclusive, respectively. Since the circuitry for transistors $Q_3$ to $Q_8$ would be substantially identical to the circuit for $Q_2$, the circuitry for these additional transistors has been omitted for the sake of simplicity. The last transistor in the series $Q_n$ energizes L5 after all of the coils have been sensed for the more-less condition so as to provide continuity between lines 52 and 56 for a purpose to be more fully explained hereinafter.

Returning now to $Q_2$, when it fires, the TI 484 transistor beneath $Q_2$ conducts and provides a path to ground for line 81. At this point, it should be mentioned that the information fed into the coils of the right hand or positional relays M8BB to M11BB and M5BB to M7BB represents the gauge position which the punch currently occupies. The information fed into lines 8B to 11B and 5B to 7B is the demand information or the position to which the punch should be moved. It now remains to compare the present position of the punch with the proposed position of the punch to determine whether or not the punch should be moved inwardly or outwardly with respect to the angle of the work piece. It will now be assumed that we are concerned for the moment with the right hand punch and that this punch is 2/16 and 3/16 inches away from the angle of the work piece. Relays M8BB to M11BB represent 1/16, 2/16, 4/16 and 8/16 of an inch, respectively, and relays M5BB, M6BB and M7BB represent 1, 2 and 4 inches, respectively. Similar considerations hold true for the opposite demand relays L8B to L11B and L5B to L7B. Since we have assumed a condition where the punch occupies a position 2/16 and 3/16 inches from the angle of the web, then relays M8BB, M9BB and M6BB only would be energized. Let us further assume that it is desired to move the punch to a position which would be 3/16 and 2/16 inches away from the angle of the web. Under these conditions, the left hand coils of L9B, L5B and L6B only would be energized. As soon as $Q_2$ conducts to provide a path to ground for line 81, the circuit from 81 to L10 is as follows: L8B is not energized and has been cleared so that the lower movable contact will bear against the lower right stationary contact which in turn connects with the center movable contact of M8BB. Since M8BB is energized, this center movable contact will connect with line 50 so as to energize the "more" coil of L10. This means as far as these two relays only are concerned that the present position of the punch is more than that called for by the demand relay on the left hand side of the diagram. At this point, the movable contact of L10 will be moved upwardly so as to be in communication with line 48.

As soon as $Q_3$ (not shown) fires, a path to ground is provided for line 82 and conduction through line 82 is as follows: relay L9B is energized as is also relay M9BB. The lower movable contact for relay L9B will rest against the lower left hand stationary contact of this relay which in turn connects with the right hand movable contact of M9BB. However, since M9BB is energized, the right hand movable contact will bear against the right hand stationary contact which does not connect with anything. Thus, neither coil of relay L10 is energized through line 82. Line 83 will be grounded by $Q_4$ (not shown) and conduction through this line is as follows: neither L10B or M10BB are energized and thus the continuity from 83 goes to the lower movable contact to the right hand stationary contact of L10B to the center movable contact of M10BB and to the left hand stationary central contact of M10BB which connects with nothing. Again, the grounding of line 83 will not affect the condition of L10.

Since neither L11B or M11BB is energized, the grounding of line 84 through its associated transistor will not affect L10.

L5B will be energized while M5BB is not. Thus, when 85 is grounded by its associated transistor, the path of conduction is as follows: the lower movable contact bears against the left hand stationary contact of L5BB which in turn connects with the right hand movable contact of M5BB. Since M5BB is de-energized, the right hand movable contact will be bearing against the left hand stationary contact which connects with the line 49 to the "less" coil of L10. Thus, the grounding of line 85 will energize the "less" coil of L10, flipping its movable contact to the left.

As far as line 86 is concerned, both L6B and M6BB are energized. When line 86 is grounded by its associated transistor, conduction occurs through the lower central and left hand contacts of L6B to the right hand movable contact of M6BB which is resting against the right hand stationary contact, the latter connecting to nothing. Therefore, grounding of line 86 will not affect L10.

Coming now to line 87, since L7B and M7BB are both de-energized, the position of L10 will not be affected when 87 is grounded by its associated transistor.

The scanning of the various relays has now been completed by the integrator circuit comprising $Q_2$ to $Q_8$, inclusive, and the relay L10 is in the "less" position, meaning that the gauge position of the right hand punch is less than that to which it should be moved. Immediately after $Q_8$ (not shown) is extinguished, $Q_n$ fires placing lines 52 and 56 into communication with each other, such that 110 D.C. passes through L10 into line 47. This will cause the right hand punch to move outwardly away from the angle of the work piece in a manner later to be described. However, as the punch moves outwardly, the positional information fed to relays M8BB to M11BB and M5BB to M7BB will change accordingly until the punch reaches the 3/16 and 2/16 position at which time the left hand relays will match the right hand relays. It should be apparent when this condition is reached that continuity will be provided starting from line 52 and L5 through the various contacts of the left and right hand relays from the bottom upwardly emerging through line 51 to M5 so as to energize M5.

As soon as M5 is energized, line 52 connects with line 34 to L11 in FIGURE 10C. If the two drums have already stopped in the correct position and if the carriage has also stopped at the correct position, relay L11 will be in the "travel verified" position. Otherwise, if the particular punch has moved to its correct position before the carriage has stopped in its correct position, relay L11 will still be in the "travel" position in which case line 34 wlil not connect with anything and the condition of the gauging circuit will remain as previously described until the "travel verified" relay of L11 is energized. Assuming that the "travel verified" coil of L11 has become energized, current will pass into L11 from line 34, from L11 through line 33 to L8 and to line 26. Line 26 connects back into the tape step relay L6 in FIGURE 10D, energizing the left hand side of L6 so as to place 110 volts A.C. across the tape motor and also across the coil of M7. M7 cuts the power from line 56 and hence the motors which move the punch for gauge position are stopped immediately. During the period of time that M7 is on, 1F will be connected to line 55 which, in turn, connects into the brake solenoid for the inch drum and the fraction drum and the solenoid AS2 which closes the inch drum to the fraction drum, thereby preventing the two drums from moving during the period of time that the tape motor is on and during the period of time that the punching operation occurs. Also while M7 is on, M12 will be energized to reset the integrator circuit, such that as soon as M7 is de-energized and with the tape properly superimposed over the diodes, the integrator circuit will be in condition to operate the gauging circuit as described above. Again, while M7 is on, the right hand side of L5 will be energized to disconnect line 52 from line 56. The tape motor will begin moving as will be described hereinafter in greater detail.

Line 26 also connects with the "start" coil of the punch relay L4 so as to energize this coil and place 1F on line 28 which in turn connects with 28R, placing 220 volts A.C. on the punch coil (not shown) causing the right hand punch to punch. After the punching operation is completed and as the punch retracts, microswitch S4 is closed so as to energize the "stop" relay of L4, removing the power from line 28 to stop the punch. Closing of the microswitch S4 also energizes the "travel" coil of L11 so as to reset this relay for the punching of the next hole.

As set forth above, when M5 is energized, 110 volts D.C. passes through line 56, line 52 into M5 into line 34 to L11, from L11 to line 33 into line 26 to L6 energizing the left hand coil thereof placing power on the tape motor and energizing M7. As soon as the 110 volts A.C. (to the right of the tape motor) is imposed upon the coils thereof, the tape motor commences to move. Associated with the tape motor are two microswitches S5 and S6, both of which are adapted to be contacted by a cam on the armature (designated by the reference character A) of the tape motor. When the tape motor is stopped in a normal position, i.e., for the transfer of information through the tape and photo-diodes to the various demand circuits, the cam will be normally resting against the microswitch S5 to hold it in an open position. However, as soon as the tape motor commences to move, the cam on the armature will move away from S5 causing the latter to close forming a parallel circuit with the contacts of L6 for the supply of 110 volts A.C. to the tape motor. As the tape motor continues to turn and as it approaches the position where the next set of holes in the tape will be properly disposed over the photo-diodes, the cam on the armature will first contact normally open switch S6, closing the same so as to energize the right hand coil of L6 through the now closed right hand contacts of L9 (later to be described). As soon as the right hand coil of L6 is energized, the circuit between line 58 and 59 through L6 is broken; however, as indicated above, a parallel circuit is provided through S5 which is still closed at this time. Continued movement of the tape motor after energizing S6 will cause the cam to contact S5 opening the same and shutting off the power to the tape motor. At this point, the holes in the tape will be properly aligned over the bank of photo-diodes. When the tape motor stops, power is removed from M7 and 1F is again restored to line 56.

With the power being restored to line 56, the inch drum and the fraction drum can commence moving as before, if such movement is indicated, and thereafter the carriage can move as described above while the appropriate punch is moving to its proper gauge position, the punching operation will be completed as described above, and so on until the tape has moved to the last punching position.

After the last punching operation has been completed, the tape will advance to a new position where additional information will be fed to the various circuits described above; however, in addition, as will be explained hereinafter in connection with a description of the tape itself, the diode below the hole 12B will be actuated to energize M2 so as to place the stepping coil of SW2 in parallel with the stepping coil of SW1. The demand information now being fed into the lineal feet circuit may, for example, call for a position six or eight feet or more beyond the last punching position. The information which will be fed into the lineal inches circuit and the lineal fractions circuit is immaterial and, in fact, can be blank. The information fed into the gauge circuit is generally not material but, for reasons appearing hereinafter, it is desirable to have the right punch move outwardly away from the apex of the work piece. Accordingly, the information fed into the gauge circuit can be such as to provide this type of movement for the right hand punch. At any event, the carriage will commence to move at (full) forward speed and thereafter the stepping switches SW1 and SW2 will move in unison. At some point, for example, three or four feet before the carriage actually stops, the center arm of SW2 will apply 1F through L7 and M2 to line 36 which leads to relay L8 (see FIGURE 10C). Line 36 will actuate the "dump" coil of L8 so as to de-energize the angle clamp solenoid AS4 and to simultaneously energize the roller bed solenoid AS3.

As set forth previously in connection with the general mechanical description, one side of the support for the work piece is pivotally mounted and is movable downwardly under the action of the roller bed solenoid AS3, such that the work piece will immediately discharge from the work holder onto a table or other convenient station for collecting finished work pieces. Action of L8 interrupts continuity between line 33 and line 26 so as to prevent actuation of the punch relay L4 and the tape step relay L6. The carriage will continue to travel at forward speed until it reaches the correct foot, at which time line 39 will energize M1 to put the carriage in slow speed. Thereafter, the inch drum will drop, the inch cam will make a ground against the foot stop, solenoids HS1 and HS2 will be de-energized, and nothing will happen thereafter until the operator pushes the reverse button PBS 2.

In order to bring the carriage back to its initial starting position and to reset the tape, the operator pushes PBS 2, energizing the right hand coil of L1, creating 1R and immediately placing 110 volts A.C. on reverse solenoid HS2, such that the carriage commences moving in a reverse direction at full speed. At the same time, line 38 is grounded at the moment PBS 2 is depressed so as to energize the left hand coil of the tape reset relay L9. When L9 is so energized, continuity is provided through its left hand contacts between lines 58 and 59 so as to start the tape motor. At the same time, the right hand contacts are opened, such that the intermittent opening and closing of S6 will have no effect whatever on the tape step relay L6. Furthermore, since L9 is a latching relay, the intermittent opening and closing of S5 will have no effect on the stopping of the tape motor. However, as the tape advances towards its initial starting position, as will hereinafter more fully appear in connection with the description of the tape itself, an appropriate opening in the tape designated as 12A will actuate the 12A photodiode so as to energize the right hand side of relay L9. The tape motor then will continue to move thereafter until the cam on the armature next contacts the normally closed switch S5 to open the same and interrupt the supply of 110 volts A.C. to the tape motor.

In the meantime, the carriage is moving in a reverse direction at full speed. As the forward end of the carriage approaches the zero position, which as will hereinafter appear is represented by the left hand punch, a cam on the carriage will actuate a normally open microswitch S2 which is physically located on the supporting structure near the punches. This action closes the switch S2 so as to supply 110 volts A.C. through the contact of L1 to the slow solenoid HS2, thereby slowing the reverse movement of the carriage. Shortly thereafter, this same cam will contact a second normally closed microswitch S1, opening the same to interrupt power to both HS2 and HS3, thereby stopping the carriage at the zero position. Now, all that remains in order to start another sequence of operations is to have the operator depress PBS 1 and the entire sequence will be repeated as set forth above. At this point, a new tape can be inserted, if desired.

When PBS 2 is depressed and the "reverse" coil of L1 is energized to produce 1R, it should be pointed out that 1R is also supplied to the foot count switch SW1 and the dump switch SW2 as shown in FIGURE 10A of the drawings. For the sake of simplicity, the switches are shown as having fifteen stationary contacts over which the movable central contact is adapted to ride; however, in actual practice, the number of stationary contacts arranged in circular fashion will be equal to the maximum number of feet that the carriage will travel. Obviously, if the actual number of stationary contacts on a given stepping switch exceeds the physical requirements of the machine or the punching operations to be performed by the machine, two or more switches can be arranged in series. At any event, the switch SW1 will have stopped at a position corresponding to the last information fed into the lineal feet circuit immediately prior to dumping. The position of the dump switch will be seven or eight feet beyond its zero reference point, depending upon the position of dumping as related to the last position of punching. Nevertheless, it is desired to return both switches SW1 and SW2 back to their zero reference positions prior to any movement of the carriage. Thus 1R is shown as being connected to the two switches. The center arms of both switches are shown at their zero reference position and are such that the cam on the switch shaft is separating the contact points at the left side of the switches. If the center arm of either switch is at any position other than the zero reference position as shown, the contacts would be closed and 1R would be passing into the coil of the stepping switch.

At the right hand side of the stepping switch are a series of contacts which are adapted to make and break intermittently as the shaft turns, thereby permitting the coil to be energized intermittently. It must be emphasized that the stepping switches will not step until the coil is de-energized after having been energized. Thus, merely placing voltage on the coils will not suffice to move the arm. It is necessary that the voltage be applied and then removed and for this purpose, the contacts at the right hand side of the switches provide intermittent application of voltage to the coils of the switches. However, when the center arm of each switch, for example, SW1 returns to the zero position, the cam on the shaft of the switch will contact the center reed, left hand side of the switch as shown in FIGURE 10A, so as to separate the two points and remove 1R from the coil of the switch, thereby insuring that the switch will stop at its zero reference position.

FIGURE 10A shows a typical photo-diode tape reader connected to the coil of M6A. This same circuit can be used as a tape reader for all of relays M1A to M10A, inclusive, and M1B to M4B, inclusive. This circuit can also be used as a cam monitor for relays M7AA to M10AA and relays M1BB to M4BB.

Briefly stated, the lower side of the coil in relay M6A is connected to 35 volts D.C. The upper side of this coil is connected to the collector of the TI 495 transistor shown to the left of this coil. The photo-diode IN 2175 is in series between the lower side of the coil for M6A and the base of the transistor. If the hole in the tape representing the 6A position allows light to pass to the photo-diode, the latter becomes conductive to place positive bias on the base of the transistor such that the same conducts to energize the coil of the relay. The same considerations hold true for the other relays listed above. However, as far as the relays referred to in terms of a cam monitor relationship, a disc such as shown in FIGURE 12 or 13 is provided. This disc has a series of circumferential slots spaced radially from the center of the disc and at different angular dispositions so as to represent the actual physical position of the inch drum or the fraction drum at any given moment and, again, on a binary system basis. Therefore, the photo-diode systems which are connected to leads 7AA to 10AA and 1BB to 4BB will be variously energized depending upon the positions of the two drums.

The means for energizing the coils of M1A to M10A, inclusive, M1B to M4B, inclusive, M7AA to M10AA, inclusive, M1BB to M4BB, inclusive, have been described in terms of the photo-diode circuit appearing to the left of relay M6A. As far as the coils for relays M1AA to M6AA are concerned, information is fed into these relays through the stepping switches SW1 to SW6 and the microswitches S7A, S7R, S8A and S8R as described above. It merely remains to describe now the circuits for actuating the coils for the gauge system. As shown in FIGURE 10D in the upper central portion thereof, there is illustrated a typical photo-diode tape reader which is indicated as being connected to the left hand coil of L11B. Assuming that the opening at the 11B position was permitting light to be directed onto the diode IN 2175, this diode becomes conductive, placing a positive bias on the base of the transistor TI 495 causing the same to conduct so as to energize the coil immediately to the right of the transistor, thereby grounding line 11B. The effect of this ground will be to energize the left hand coil of L11B. Similar circuits are provided for relays L8B to L10B, inclusive, and L5B to L7B, inclusive.

Figure 10E:
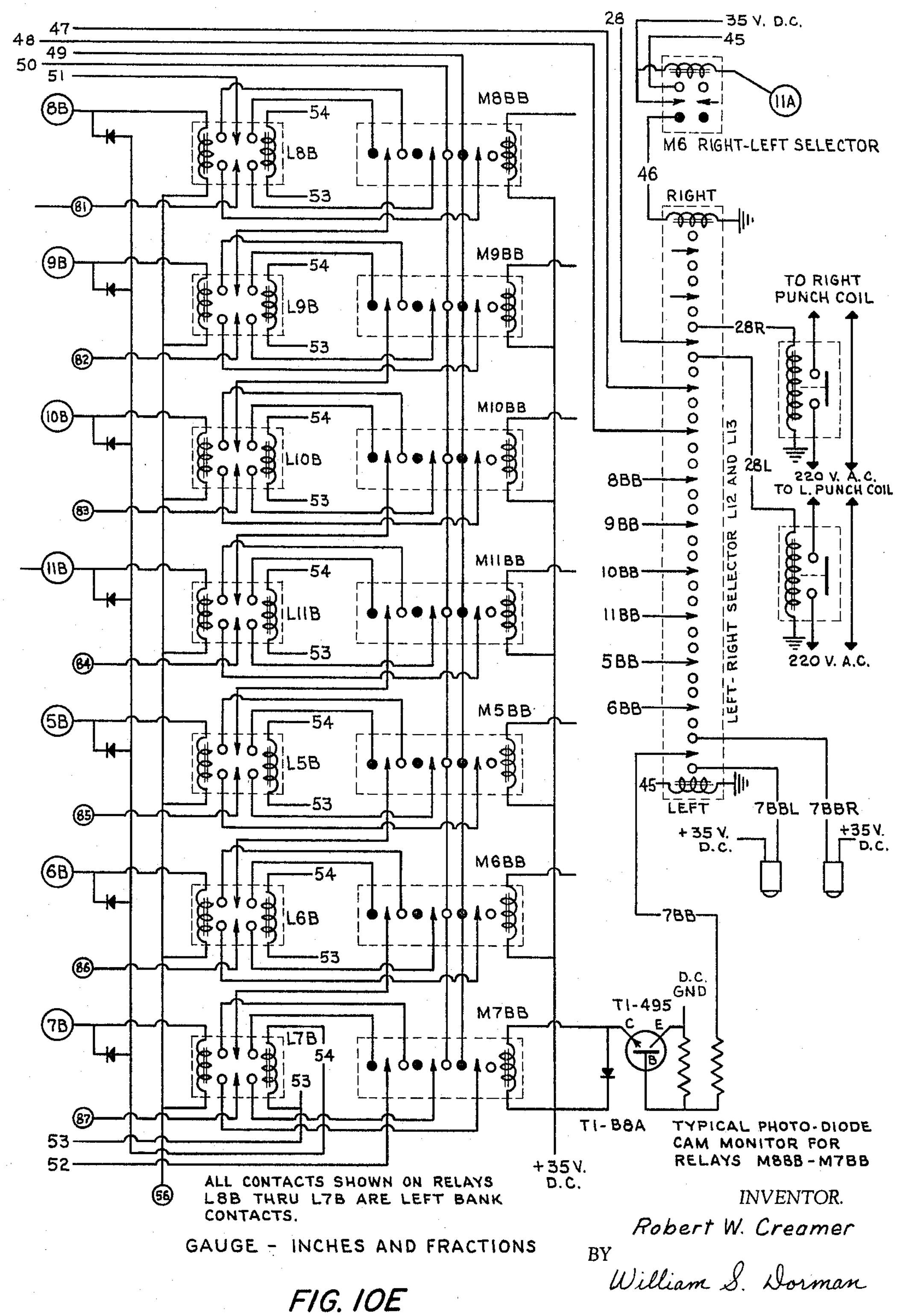

Turning now to the momentary relays M8BB to M11BB and M5BB to M7BB, a typical photo-diode monitor is shown in FIGURE 10E and in particular as being connected to the coil of M7BB. It will be assumed that the right hand punch is the one which is being selected for use at this particular time. Actually, if the left hand punch were to be selected, a hole corresponding to the position of 11A would be energizing a suitable photodiode providing a ground for the coil in M6 so as to energize the left hand coil to line 45 of the combined latching relays L12 and 13. However, since as indicated above, the right hand relay is energized, there is no hole at the 11A position and the right hand coil of combined latching relays L12 and 13 is energized so as to pull all of the contacts thereof upwardly as considered in view of FIGURE 10E. Line 7BB will then be in continuity with line 7BBR. Now, if the photo-diode connected with line 7BB*r* is energized through a disc operatively connected to the shaft of the motor which moves the right hand punch inwardly and outwardly, a circuit to the 35 volts D.C. would be provided through this diode and through the resistor to the base of the transistor TI 495 causing the same to conduct so as to energize the coil of M7BB. The lines indicated as 8BB to 11BB and 5BB and 6BB are similarly connected to the upper porions of the coils of relays M8BB to M11BB and M5BB and M6BB, respectively.

The means for operating the more-less relay L10 and for controlling the operation of the gauge circuit is shown in FIGURE 10D as an electronic transistorized integrator circuit; however, if desired, it is possible to replace this integrator circuit with a mechanical stepping switch which will be energized from a fixed reference position to move through a series of steps corresponding to the number of relays shown at the left of FIGURE 10E. The first set of contacts of the stepping switch can be employed for clearing the right hand portions of relays L8B to L11B and L5B to L7B in similar fashion to $Q_1$. The next seven contacts in sequence can be used to operate the more-less relay L10 through connections 81 to 87, inclusive. The last set of contacts on this mechanical stepping switch can be used to energize relay L5. Any conventional means can be employed for returning this mechanical stepping switch back to its zero reference position in advance of its use in connection with the next subsequent gauging operation. It will be observed that diodes are connected in parallel with the coils for M6A, M13, L5 (left side), L10, M10, M7BB and the photodiode circuit connected to 11B. These diodes are designed to prevent damage to the associated transistors after the latter become non-conductive and after collapse of current in the associated coils.

Before describing the tape itself and the manner in which it operates the photo-diodes, it should be mentioned that the left punch, as it appears in FIGURE 4, represents the zero reference position for carriage travel. In other words, the center line of the actual physical punch represents the zero reference position. The right hand punch is located in a forward direction such that the center line of its actual punch is physically spaced two feet exactly from the center line of the left hand punch. When programming the tape, there is no particular difficulty involved as far as the left hand punch is concerned since the physical distances along the work piece can be set into the tape directly with respect to this punch. However, as far as the right hand punch is concerned, all of the physical dimensions are figured out in advance and two feet are added to these various dimensions so that the right hand punch will be properly correlated with respect to the zero position. It was indicated heretofore that information is fed into the gauging circuit immediately prior to dumping for the purpose of moving the right hand punch outwardly. The reason for this is as follows, considered particularly in light of the above explanation. In order for the carriage to move approximately to the zero reference position, it must go past the right hand punch. However, if the right hand punch is too close to the apex of the angle, as it might otherwise be if it had not been retracted, there would be interference between the clamp and the right hand punch. Therefore, the punch is retracted prior to returning the carriage to its zero reference position. Since the right hand punch will not operate while the left hand punch is working on the first two feet of the work piece, there can be no possible interference between the clamp and the right hand punch. After the work piece moves two feet beyond the left hand punch, then the right hand punch can be operative if the situation demands the same.

FIGURE 11 represents a continuous tape which is designed to be moved in the direction indicated by the arrow over a double bank of photo-diodes (not shown). Each bank of diodes includes two rows with twelve diodes in each row so as to occupy positions corresponding to lines A and B in the vertical and line 1 to 12 along the horizontal, referring to the tape shown in FIGURE 11.

In the description of the operation of the present invention, particularly as far as the over-all electrical circuit was concerned, one of the early assumptions was that the fraction drum should be turned to a position corresponding to 13/16 of an inch and it was further indicated that for this condition to hold valid, relays M1B, M3B and M4B should be energized. The left hand row B on FIGURE 11 shows holes in positions along the vertical "B" line corresponding to the 1, 3 and 4 positions. Light passing through these holes and energizing photo-diode circuits similar to that shown connected to M6A would permit the passage of 35 volts D.C. through the coils of M1B, M3B and M4B.

Another prior assumption involved the advance from one foot, one inch to one foot, eleven inches. It will be further assumed that the right hand punch is involved at this time; therefore, the information which should be placed on the tape in view of the position of the right hand punch with respect to the zero reference line will be 3 feet, one inch to three feet, eleven inches. Thus, the left hand line A (FIGURE 11) shows openings in the 1, 2 and 7 positions. The middle line A on FIGURE 11 shows openings at the 1, 2, 7, 8 and 10 positions. The fraction measurement will be assumed to have remained at 13/16 inch in which case the center line B has holes in the 1, 3 and 4 positions as before. Again, since the right hand punch is being used for the first two conditions shown on the tape, there will not be a hole in the 11A position in either the left hand A row or the center A row. If it is desired to use the left hand punch, then a hole would be present in the 11A position so as to energize M6, moving all of the movable contacts of L12 and L13 downwardly towards the "left" coil of this combined latching relay.

The right hand rows A and B will be used to represent the discharge position or that position to which the tape moves after the last punch is made (immediately prior to the release of the work piece from the punching apparatus). It should be noted that there is a hole in right hand line B in the 12 position which will energize M2 to provide the dumping operation described above. Since it is desired to move the right hand punch outwardly, there will be no hole in the 11A position. However, there are holes in the 5B, 6B and 7B positions to move the right hand punch out seven inches for the reasons indicated previously the position of the fraction drum is not material as far as the discharge of the work piece is concerned so that this drum can be returned to its zero position. For this reason, there are no holes in the 1B, 2B, 3B and 4B positions. Similarly, the position of the inch drum is not material to the discharge of the work piece and for this reason, there are no holes corresponding to the 7A, 8A, 9A and 10A positions. On the other hand, it will be necessary to move the carriage out beyond the last punching operation and preferably towards the outer limit of travel of the carriage. For the purpose of this illustration, it will be assumed that the last punch was made approximately at the forty-two foot position and that the length of the work piece is only slightly longer than this. The apparatus will then be set up to discharge the work piece at the fifty-one foot position. Accordingly, there will be holes in the right hand A line at the 1, 2, 5 and 6 positions. The above figures are merely illustrative.

It will be observed that there is a hole in the 12 position in the line immediately preceding the left hand line A. The purpose of this hole is as follows: when the reverse button PBS2 is depressed, line 38 is grounded to reset the contacts of L9 towards the right so that the tape motor will move continuously. When the hole in the 12 position referred to above passes over the 12A diode as the tape approaches its completely returned position, the relay L9 will be energized towards the right such that the tape motor can be de-energized by microswitch S5 thereafter and the tape will stop with the left hand lines A and B shown on FIGURE 11 properly positioned over the double bank of diodes as described above.

The circular holes which are located along the longitudinal center line of the tape at evenly spaced intervals represent the sprocket holes which engage the sprocket (not shown) for moving the tape.

Summarizing, the left hand hole in the 12 position in FIGURE 11 is for the purpose of stopping the tape in the correct (first) position. The information in the first two rows (left hand rows A and B) call for the carriage to stop at a position of 3 feet, 1/16 and 13/18 inch from the zero reference point. In the alternative, since the right hand punch is the one being used, the carriage will stop with the forward end of the work piece 1 foot, 1/16 and 3/16 inches advanced beyond the right hand punch. The hole to be punched in accordance with the first two rows of information will represent a gauge of 2/16 and 3/16 inches.

The middle two rows of information call for a position of the carriage of 3 feet 11 13/16 inches from the zero reference position. The punching position is represented by a gauge of 3/16 and 2/16 inches.

The last two rows on the tape in FIGURE 11 call for a movement of the carriage to the fifty-one foot position in connection with the dumping operation which precedes the stopping of the carriage by several feet. The right hand punch will be moved outwardly seven inches. The tape will stop in this position and will remain there until the return button PBS2 is depressed to start the cycle over again as set forth above.

In the preceding description, reference is made to the movement of certain elements in terms of the actuation of solenoids which are described as directly moving these elements; however, for certain types of movements, it is oftentimes desirable to use another type of prime mover with the solenoid acting as the control means. For example, the means for raising and lowering the inch drum assembly is shown in the drawings and has been described in the specification as solenoid AS1. In actual practice, it is preferable to use a hydraulic piston and cylinder combination where the control of hydraulic fluid to and from the cylinder is controlled by means of a solenoid, such as AS1. Thus, where the foregoing description refers in any given instance to actuation or movement of an element by a solenoid, it should be understood that other motive means can be used in combination with the solenoid, in which case the solenoid itself is merely used as a control means. The additional means could be various electrical or pneumatic motors, various pneumatic or hydraulic piston and cylinder combinations and further combinations of the above using various levers, gears, ratchets, etc., as desired. These modifications obviously fall within the purview of the present invention.

The movement of the carriage has been defined in terms of feet, inches and fractions of an inch. The movement of the punches has been described in terms of inches and fractions of an inch. On the other hand, any convenient unit or units of measurement may be selected as desired. For example, the above described system might be converted completely to metric units. Alternatively the inches and fractions might be converted to decimal portions of a foot. It should be obvious that the selection of any given system or systems of units falls within the purview of the present invention.

The means for controlling the movement of the carriage has been defined in terms of cams mounted on the side of the carriage, microswitches actuated by these cams and stepping switches actuated by the microswitches. On the other hand, it should be apparent that the cams and microswitches could be eliminated by substituting for the cams a long thin strip of material, such as aluminum or the like, running the entire length of the carriage with a set of longitudinally extending slots spaced transversely across the strip and located at positions corresponding to the successive feet of the carriage. For example, referring to FIGURE 10A, the positional and demand relays are six in number. Therefore, to accommodate itself to the electrical description set forth herein, the slots in this continuous strip could be provided in various combinations of six different positions preferably representing six different distances, respectively, in a transverse direction from a given reference line. With the above proposed arrangement, the stepping switch SW1 and its associated relays could be eliminated. However, it will still be necessary to use two sets of photo-diodes which will be alternately connected into lines 1AA to 6AA, inclusive, respectively. One set of diodes would be designated as "advanced diodes" and would be actuated by M11 when the latter was de-energized. A second set of diodes designated as "retarded diodes" would be actuated by M11 when the latter was energized, i.e., whenever the lineal inches circuit called for a measurement of six inches or more. For inch measurements of nine, ten or eleven inches, the delay for actuating solenoid AS1 could be provided by a separate reset slot on the strip operating in conjunction with a separate reset photo-diode and a momentary relay to provide continuity between lines 21 and 40 subsequent to the energization of slow solenoid HS2.

The above description, particularly as regards FIGURE 10D, shows the means for operating the more-less relay L10 and for controlling the operation of the gauge circuit as an electronic transistorized integrator circuit. It has been suggested, also, that it is possible to replace this integrator circuit with a mechanical stepping switch, the operation of which has been previously described. As shown in FIGURES 14 and 14A, it is also possible to replace the electronic transistorized integrator circuit with a relay operated circuit. For this purpose, a plurality of relay modules (later to be described in detail in connection with FIGURE 14A) and designated by the reference characters 301 to 309, inclusive, are provided for lines 53, 81 to 87, inclusive, and L5, respectively. For the sake of simplicity, modules 303 to 307, inclusive, are not shown in FIGURE 14, but their electrical connections would be the same as shown with respect to modules 302 and 308.

Integrator control relay M12 and the relay L5 will be employed as before, but their contacts will be connected somewhat differently in the manner described below. The coil of M12 will be connected to line 37 leading to M7 and PBS1 as before. However, the left hand reed of M12 will be grounded and the left hand normally open contact will be connected to the right hand coil of L5, such that when M12 is energized, the right hand coil of L5 will be energized, 1F passing through this right hand coil and through the ground connection provided by M12. The right hand reed of M12 is connected to the contact immediately to the right of the left hand reed of L5, this latter reed being connected to 35 volts D.C. The upper end of the left hand coil for L5 is connected to 1F and the lower end of this coil is connected to the normally open contact of contact group 309E of module 309, the purpose of which will hereinafter appear. The right hand reed of L5 is connected to line 52 as before and the contact to the left of the last mentioned reed is connected to line 56 as before.

Turning for the moment to FIGURE 14A, the internal details of the module 301 are shown semi-diagrammatically. Whereas FIGURE 14A merely shows the relay module 301, it should be understood that the remaining modules 302 to 309, inclusive, are substantially identical. Module 301 includes a first relay or coil 301X having contact groups 301A and 301B which are actuated when the relay 301X is energized. Contact groups 301A and 301B are not shown in FIGURE 14A as being connected to anything. However, these contact groups and the corresponding contact groups of the remaining modules are shown (diagrammatically) connected into the circuit in FIGURE 14. A second relay consisting of coils 301Y and 301Z is positioned to the right in the module 301. Coils 301Y and 301Z are preferably concentrically and oppositely mounted so that when both coils are energized, the contacts of the relay are unaffected. The contact groups for this right-hand relay are shown as 301C, 301D and 301E. Again, no connections are shown for these contact groups in FIGURE 14A, although these groups are connected into the circuit in FIGURE 14. Each of the contact groups 301A to 301E, inclusive, includes a movable reed, a normally closed contact (against which the reed rests when the relay is de-energized) designated by a black dot and a normally open contact designated by a circle.

Also shown in FIGURE 14A is a diode 301V connected between the two coils 301Y and 301Z. A lead designated as S (representing the "signal" input line) connects with the upper end of coil 301Z and extends outwardly from the module 301. Another lead designated by the reference character H (standing for "holding" line) is connected to the upper end of the coil 301X and extends outwardly from the module 301.

Returning now to FIGURE 14, when M12 is energized by M7 or PBS1, the upper end of the right hand coil of L5 is grounded, such that 1F passes through this coil, latching the relay L5 towards the right. This action of L5 places line 52 in communication with line 56 for the reasons stated heretofore. Also 35 volts D.C. is placed on the contact immediately to the right of the left hand reed. Hence, 35 volts D.C. is imposed upon the right hand reed of M12. Thereafter, when M12 is de-energized, 35 volts D.C. is imposed upon the right hand closed contact of M12.

Lead 311 connecting with the right hand normally closed contact of M12 supplies 35 volts D.C. to a wave generator 310. The wave generator 310 may be either a transistorized or a mercury relay with appropriate time constants (condensers, resistors) which sends a square wave pulse of approximately 35 volts at an appropriate width and at an appropriate frequency into the modules as follows: The output from the wave generator 310 is fed through normally closed contacts 309C, 308C, 307C (not shown), 306C (not shown), 305C (not shown), 304C (not shown), 303C (not shown), 302C, 301C and into the lead S for the module 301. It should be noted that contacts 301D to 308D are normally open at this time so that the pulse from the wave generator is not fed into modules 302 to 309, inclusive, respectively. When the positive pulse from the wave generator 310 passes through the line S into the module 301, it energizes the right hand coil 301Z of the right hand relay of the module 301. This pulse also passes through the diode 301V to energize the left hand coil 301Y of the right hand relay and the left hand relay 301X simultaneously.

Since the same voltage is imposed upon 301Y and 301Z, the contacts of this right hand relay will not be affected as described above. However, the pulse through the diode 301V will energize the relay 301X to actuate contact groups 301A and 301B. As soon as the latter is accomplished, 35 volts D.C. will pass through the normally closed contacts 302A, the now closed contacts of 301B and into the holding line H for maintaining 35 volts D.C. on the relay 301X. As soon as the pulse from the wave generator 310 drops to zero, the right hand coil 301Z becomes de-energized while 35 volts D.C. remains imposed upon the left hand coil 301Y, such that the right hand relay in the module 301 now becomes energized to actuate contact groups 301C, 301D and 301E. When 301E is energized, 1F passes from this contact group to line 53 to reset the left bank of relays shown in FIGURE 10 as described before. When the right hand relay of module 301 is energized, 301C becomes open to prevent any further pulse from the wave generator 310 from passing into the signal line S of 301; at the same time, the normally open contacts of 301D are closed so as to place the relay module 302 in a condition to receive the next pulse from the wave generator 310.

It should be noted that the right hand relay of module 301 (as would be the case with the remaining modules) is not energized until the pulse from the wave generator 310 falls to zero. As soon as the next (positive) pulse from the wave generator 310 passes into the line connecting contact groups 301C to 309C, inclusive, in series, this pulse will pass from 302C through the now closed contacts 301D and into the module 302. Since the normally closed contacts 301C are now open as a result of the energization of the right hand relay of module 301, this pulse cannot pass into module 301. Likewise, since contacts 302D to 308D are still open, this pulse cannot pass into modules 303 to 309, inclusive. This pulse will energize coils 302X, Y and Z (not shown) simultaneously, immediately actuating the left hand relay (not shown) in module 302, closing the normally open holding contacts 302B and opening the normally closed contacts 302A.

The closing of contacts 302B will permit the 35 volts D.C. to pass into the holding line of module 302, while the opening of the contacts 302A will prevent the passing of 35 volts D.C. into the holding line of module 301. Shortly after the relay 302X (not shown) is energized and after the pulse from the wave generator falls to zero, the right hand relay (not shown) of module 302 is energized so as to actuate contacts 302C, 302D and 302E. 302C, when actuated, will prevent any further pulse from the wave generator from passing into modules 302 or 301. Closing of contacts 302D (not shown) will place module 303 (not shown) in condition to receive the next pulse from the wave generator 310. Closing of the contacts 302E will ground the line 81 so as to start the sequencing of the more-less relay L10 in the same manner as described previously.

After 302 has been energized in the manner described above and after the next pulse comes from the wave generator 310, module 303 (not shown) will be similarly energized; modules 303 to 308 will be energized in sequence in the same manner described above and these will make circuits through lines 81 to 87, inclusive, to complete the actuation of the more-less relay L10. Contacts 308E, when closed, for example, will provide a grounding for the line 87 in the same manner that 302E provides a ground for the line 81.

After module 308 has been energized and after the next pulse is sent out from the wave generator 310, the module 309 is energized, while module 308 becomes deenergized. When module 309 is energized, contacts 309E of this module (shown immediately below the left hand portion of relay L5) close to provide a ground for the lower side of the left hand coil of L5, thereby interrupting communication between line 52 and 56 and removing 35 volts D.C. from line 311 to prevent further sequencing of the relay modules. The relay modules will not be sequenced again until M12 is energized. These and other consistent electrical modifications obviously fall within the purview of the present invention.

Whereas the present invention has been described with particular relation to the drawings attached hereto, it should be understood that other and further modifications apart from those shown or suggested herein may be made within the spirit and scope of this invention.

What is claimed is:

1. An automatic system for moving a work piece a predetermined longitudinal distance through and beyond a work station comprising a work station, a longitudinally extending support means mounted on opposite sides of said work station, a longitudinally extending track mounted on one side of said longitudinal support means, a carriage mounted on said track and movably therealong for drawing a work piece longitudinally through said work station, a clamp means on one end of said carriage for engaging the forward end of said work piece, a carriage drive motor for moving said carriage, speed control means associated with said carriage drive motor for determining the speed and direction of movement of said carriage, said speed control means including a forward solenoid for causing movement of said carriage in a direction away from said work station at full speed, a reverse solenoid for causing movement of said carriage towards said work station at full speed and a slow solenoid for causing movement of said carriage at slow speed in either dierction of movement, a plurality of foot stops mounted at evenly spaced intervals along said carriage, a measuring station located along said longitudinally extending support means at a fixed distance from said work station, a fraction drum mounted on said measuring station for rotation on an axis substantially parallel to the longitudinal direction of movement of said carriage, a plurality of longitudinally extending fraction cams secured to the outer surface of said fraction drum at evenly spaced intervals around the periphery thereof, the ends of said fraction cams terminating longitudinally at different distances with respect to said work station by differing amounts representing the lowest desired fraction of an inch to be employed in stopping the carriage, an inch drum support mounted on said measuring station but movable longitudinally relative thereto, a fixed stop on said inch drum support adapted to engage one end of a fraction cam on said fraction drum, a retracting solenoid adapted to move said inch drum support so that said fixed stop engages the end of an appropriate fraction cam when said fraction drum has moved to its desired position, an inch drum mounted for rotation on said inch drum support on an axis substantially parallel to the rotational axis of said fraction drum, a plurality of longitudinally extending inch cams mounted at evenly spaced intervals on the periphery of said inch drum, the ends of said inch cams facing said work station terminating at different distances relative to said work station and at one inch intervals with respect to each other, a dropping solenoid associated with said inch drum support for droping said inch drum support downwardly when said drums have been turned to their desired positions for interposing the appropriate inch cam in the path of movement of the appropriate foot stop on said carriage when said carriage has reached its proper position of movement away from said work station, a plurality of reset cams mounted on the side of said carriage, one reset cam being provided for each foot stop, a plurality of count cams mounted on the side of the carriage, one count cam being provided for each foot stop, an advanced reset microswitch mounted on said measuring station and adapted to be contacted by said reset cams in succession upon movement of said carriage, a retarded reset microswitch mounted on said measuring station and adapted to be contacted by said reset cams in succession but subsequent in time to the contacting of said advanced reset microswitch as said carriage moves outwardly away from said work station, an advanced count microswitch mounted on said measuring station and adapted to be contacted by said count cams in succession as said carriage moves outwardly away from said work station, said advanced count microswitch being contacted by each count cam after the associated reset cam passes beyond said advanced reset microswitch but prior to the time that the carriage has moved to the foot corresponding to that intended to be counted by the advanced count microswitch. a retarded count microswitch mounted on said measuring station and adapted to be contacted by said count cams in succession subsequent to the contacting of said advanced count microswitch by the same count cam and after the associated advanced reset cam has passed beyond said retarded reset microswitch, said advanced microswitches being operative when it is desired to stop said carriage in the first part of a given foot, said retarded microswitches being operative when it is desired to stop said carriage in the latter part of a given foot, means for rotating said fraction drum until it reaches a desired position, means responsive to the rotation of said fraction drum to the desired position for energizing said retracting solenoid, means for rotating said inch drum until it reaches a desired position, means responsive to the rotation of both drums to their desired positions for energizing said forward solenoid to initiate movement of said carriage in a direction away from said work station at full speed, means responsive to the actuation of said reset and count microswitches by a predetermined number of cams for energizing said slow solenoid and for energizing said dropping solenoid and means responsive to the contact of said appropriate inch cam with said appropriate foot stop for de-energizing said forward solenoid and said slow solenoid so as to stop movement of said carriage.

2. Apparatus as set forth in claim 1 wherein said means for energizing said slow solenoid and for energizing said dropping solenoid is coordinated with said advanced microswitches for energizing said slow solenoid and said dropping solenoid simultaneously when it is desired to stop said carriage in the first part of a given foot.

3. Apparatus as set forth in claim 1 including means for creating a delay in energizing said dropping solenoid subsequent to the energizing of said slow solenoid when it is desired to stop said carriage in the latter part of a given foot.

4. An automatic punching apparatus comprising a work station, a longitudinally extending support means mounted on opposite sides of said work station, a longitudinally extending track mounted on one side of said longitudinal support means, a carriage mounted on said track and movable therealong for drawing a work piece longitudinally through said work station, a plurality of punching machines mounted at said work station and movable transversely with respect to said work station for punching holes in said work piece at variable distances from the longitudinal center line of said work piece, a clamp means on one end of said carriage for engaging the forward end of said work piece, a carriage drive motor for moving said carriage, speed control means associated with said carriage drive motor for determining the speed and direction of movement of said carriage, said speed control means including a forward solenoid for causing movement of said carriage in a direction away from said work station at full speed, a reverse solenoid for causing movement of said carriage towards said work station at full speed and a slow solenoid for causing movement of said carriage at slow speed in either direction of movement, a plurality of foot stops mounted at evenly spaced intervals along said carriage, a measuring station located along said longitudinally extending support means at a fixed distance from said work station, a fraction drum mounted on said measuring station for rotation on an axis substantially parallel to the longitudinal direction of movement of said carriage, a plurality of longitudinally extending fraction cams secured to the outer surface of said fraction drum at evenly spaced intervals around the periphery thereof, the ends of said fraction cams terminating longitudinally at different distances with respect to said work station by differing amounts representing the lowest desired fraction of an inch to be employed in stopping the carriage, an inch drum support mounted on said measuring station but movable longitudinally relative thereto, a fixed stop on said inch drum support adapted to engage one end of a fraction cam on said fraction drum, a retracting solenoid adapted to move said inch drum support so that said fixed stop engages the end of an appropriate fraction cam when said fraction drum has moved to its desired position, an inch drum mounted for rotation on said inch drum support on an axis substantially parallel to the rotational axis of said fraction drum, a plurality of longitudinally extending inch cams mounted at evenly spaced intervals on the periphery of said inch drum, the ends of said inch cams facing said work station terminating at different distances relative to said work station and at one inch intervals with respect to each other, a dropping solenoid associated with said inch drum support for dropping said inch drum support downwardly when said drums have been turned to their desired positions for interposing the appropriate inch cam in the path of movement of the appropriate foot stop on said carriage when said carriage has reached its proper position of movement away from said work station, a plurality of reset cams mounted on the side of said carriage, one reset cam being provided for each foot stop, a plurality of count cams mounted on the side of the carriage, one count cam being provided for each foot stop, an advanced reset microswitch mounted on said measuring station and adapted to be contacted by said reset cams in succession upon movement of said carriage, a retarded reset microswitch mounted on said measuring station and adapted to be contacted by said reset cams in succession but subsequent in time to the contacting of said advanced reset microswitch as said carriage moves outwardly away from said work station, an advanced count microswitch mounted on said measuring station and adapted to be contacted by said count cams in succession as said carriage moves outwardly away from said work station, said advanced count microswitch being contacted by each count cam after the associated reset cam passes beyond said advanced reset microswitch but prior to the time that the carriage has moved to the foot corresponding to that intended to be counted by the advanced count microswitch, a retarded count microswitch mounted on said measuring station and adapted to be contacted by said count cams in succession subsequent to the contacting of said advanced count microswitch by the same count cam and after the associated advanced reset cam has passed beyond said retarded reset microswitch, said advanced microswitches being operative when it is desired to stop said carriage in the first part of a given foot, said retarded microswitches being operative when it is desired to stop said carriage in the latter part of a given foot, means for rotating said fraction drum until it reaches a desired position, means responsive to the rotation of said fraction drum to the desired position for energizing said retracting solenoid, means for rotating said inch drum until it reaches a desired position, means responsive to the rotation of both drums to their desired positions for energizing said forward solenoid to initiate movement of said carriage in a direction away from said work station at full speed, means responsive to the actuation of said reset and count microswitches by a predetermined number of cams for energizing said slow solenoid and for energizing said dropping solenoid, means responsive to the contacting of said appropriate inch cam with said appropriate foot stop for de-energizing said forward solenoid and said slow solenoid so as to stop movement of said carriage, means for moving one of said punching machines relative to said longitudinal center line until said punching machine occupies its desired position, and means responsive both to the stopping of said carriage at its appropriate position and to the movement of said punch to its desired position for energizing said punch to punch a hole in said work piece.

5. Means for automatically controlling the movement of a movable element comprising a plurality of positional relays, means responsive to the instantaneous position of said element for energizing various of said positional relays in accordance with said instantaneous position, a set of demand relays equal in number and associated with said positional relays, means for energizing said demand relays in accordance with a position in which it is desired to have said element located, said demand relays and said positional relays being so associated with each other that the energized and de-energized conditions of the opposed relays in said sets of relays will match when the instantaneous position of said element coincides with the desired position called for by said demand relays, means responsive to an unmatched condition between said two sets of relays for moving said element towards the position called for by said demand relays, and means responsive to a matched condition of said two sets of relays for stopping the movement of said element.

6. An automatic control means as set forth in claim 5 including a direction sensing means for sensing the difference between the unmatched condition of said two sets of relays for determining the required direction of movement of said element in order to move said element from its instantaneous position to that called for by said demand relays.

7. An automatic control means as set forth in claim 6 wherein said direction sensing means includes a plurality of transistor stages operated in sequence.

8. An automatic control means as set forth in claim 6 wherein said direction sensing means includes a plurality of relay modules operated in sequence.

9. An automatic system for moving a work piece a predetermined longitudinal distance through and beyond a work station comprising a work station, a longitudinally extending support means mounted on opposite sides of said work station, a longitudinally extending track mounted on one side of said longitudinal support means, a carriage mounted on said track and movable therealong for drawing a work piece longitudinally through said work station, a clamp means on one end of said carriage adapted to engage the forward end of said work piece, a clamp solenoid for closing said clamp into engagement with the forward end of said work piece, a longitudinally extending rack on said carriage, a gear meshing with said rack, a carriage drive motor mounted on said longitudinally extending support means and engageable with said gear for driving the same so as to move said carriage, speed control means associated with said carriage drive motor for determining the speed and direction of movement of said carriage, said speed control means including a forward solenoid for causing movement of said carriage in a direction away from said work station at full speed, a reverse solenoid for causing movement of said carriage towards said work station at full speed and a slow solenoid for causing movement of said carriage at slow speed in either direction of movement, a plurality of foot stops mounted at evenly spaced intervals along said carriage, a measuring station located along said longitudinally extending support means at a fixed distance from said work station, a fraction drum mounted on said measuring station for rotation on an axis substantially parallel to the longitudinal direction of movement of said carriage, a fraction drum motor mounted on said measuring station and adapted to be placed in driving relation with said fraction drum, a fraction drum clutch interposed between said fraction drum and its associated motor for placing said fraction drum motor in driving relation with said fraction drum when said clutch is energized, a fraction drum brake associated with said fraction drum for stopping rotary movement of said fraction drum when said brake is energized, a plurality of longitudinally extending fraction cams secured to the outer surface of said fraction drum at evenly spaced intervals around the periphery thereof, the ends of said fraction cams terminating longitudinally at different distances with respect to said work station by differing amounts representing the lowest desired fraction of an inch to be employed in stopping the carriage, an inch drum support mounted on said measuring station but movable longitudinally relative thereto, a fixed stop on said inch drum support adapted to engage one end of a fraction cam on said fraction drum, a retracting solenoid adapted to move said inch drum support so that said fixed stop engages the end of an appropriate fraction cam when said fraction drum has moved to its desired position, an inch drum mounted for rotation on said inch drum support on an axis substantially parallel to the rotational axis of said fraction drum, an inch drum motor mounted on said inch drum support and adapted to be placed in driving relation with said inch drum, an inch drum clutch interposed between said inch drum and its associated motor for placing said inch drum motor in driving relation with said inch drum when said clutch is energized, an inch drum brake associated with said inch drum for stopping rotary movement of said inch drum when said brake is energized, a plurality of longitudinally extending inch cams mounted at evenly spaced intervals on the periphery of said inch drum, the ends of said inch cams facing said work station terminating at different distances relative to said work station and at one inch intervals with respect to each other, a dropping solenoid associated with said inch drum support for dropping said inch drum support downwardly when said drums have been turned to their desired positions for interposing the appropriate inch cam in the path of movement of the appropriate foot stop on said carriage when said carriage has reached its proper position of movement away from said work station, a plurality of reset cams mounted on the side of said carriage, one reset cam being provided for each foot stop, a plurality of count cams mounted on the side of the carriage, one count cam being provided for each foot stop, an advanced reset microswitch mounted on said measuring station and adapted to be contacted by said reset cams in succession upon movement of said carriage, a retarded reset microswitch mounted on said measuring station and adapted to be contacted by said reset cams in succession but subsequent in time to the contacting of said advanced reset microswitch as said carriage moves outwardly away from said work station, an advanced count microswitch mounted on said measuring station and adapted to be contacted by said count cams in succession as said carriage moves outwardly away from said work station, said advanced count microswitch being contacted by each count cam after the associated reset cam passes beyond said advanced reset microswitch but prior to the time that the carriage has moved to the foot corresponding to that intended to be counted by the advanced count microswitch, a retarded count microswitch mounted on said measuring station and adapted to be contacted by said count cams in succession subsequent to the contacting of said advanced count microswitch by the same count cam and after the reset cam has passed beyond said retarded reset microswitch, said advanced microswitches being operative when it is desired to stop said carriage in the first part of a given foot, said retarded microswitches being operative when it is desired to stop said carriage in the latter part of a given foot, a first set of positional relays for said fraction drum, means responsive to the rotary position of said fraction drum for feeding electrical energy into said first set of positional relays and for energizing various of said positional relays in accordance with the rotational position of said fraction drum, a first set of demand relays corresponding to and associated with said first set of positional relays, means responsive to the desired position to be occupied by said fraction drum for energizing various of said demand relays corresponding to said desired position of said fraction drum, said demand relays and said positional relays being so associated that each set of relays will have opposed relays similarly energized and de-energized when said fraction drum occupies the position corresponding to that called for by said demand relays, means responsive to a condition wherein said fraction drum occupies a position other than that called for by said demand relays for energizing said fraction drum clutch and for simultaneously deenergizing said fraction drum brake whereby said fraction drum will rotate until it reaches the position called for by said demand relays, means responsive to the movement of said fraction drum to the position called for by said demand relays for de-energizing said fraction drum clutch and for simultaneously energizing said fraction drum brake and said retracting solenoid, a second set of positional relays for said inch drum, means responsive to the rotary position of said inch drum for feeding electrical energy into said second set of positional relays and for energizing various of said positional relays in accordance with the rotational position of said inch drum, a second set of demand relays corresponding to and associated with said second set of positional relays, means responsive to the desired position to be occupied by said inch drum for energizing various of said second demand relays corresponding to said desired position of said inch drum, said second demand relays and said second positional relays being so associated that each set of relays will have opposed relays similarly energized and de-energized when said inch drum occupies the position corresponding to that called for by its demand relays, means responsive to a condition wherein said inch drum occupies a position other than that called for by its demand relays for energizing said inch drum clutch and for simultaneously deenergizing said inch drum brake whereby said inch drum will rotate until it reaches the position called for by its demand relays, means responsive to the movement of said inch drum to the position called for by its demand relays for de-energizing said inch drum clutch and for simultaneously energizing said inch drum brake, means responsive to the movement of both drums to the positions called for by their associated demand relays for energizing said forward solenoid to initiate movement of said carriage in a direction away from said work station at full speed, a third set of positional relays adapted to indicate, by energization of various relays therein and in accordance with the subsequent actuation of said reset and count microswitches, the exact foot position occupied by said carriage, a third set of demand relays associated with and corresponding in number to the relays in said third set of positional relays and being variously energized to indicate the desired foot position to be occupied by said carriage, said third demand relays and said third positional relays similarly energized and de-energized when said carriage is moved to the position corresponding to that called for by its demand relays, means responsive to the movement of said carriage to the foot position called for by its demand relays for energizing said slow solenoid and for energizing said dropping solenoid, and means responsive to the contacting of said appropriate inch cam with said appropriate foot stop for de-energizing said forward solenoid and said slow solenoid so as to stop movement of said carriage.

10. An automatic punching apparatus comprising a work station, a longitudinally extending support means mounted on opposite sides of said work station, a longitudinally extending track mounted on one side of said longitudinal support means, a carriage mounted on said track and movable therealong for drawing a work piece longitudinally through said work station, a plurality of punching machines mounted at said work station and movable transversely with respect to said work station for punching holes in said work piece at variable distances from the longitudinal center line of said work piece, a clamp means on one end of said carriage adapted to engage the forward end of said work piece, a clamp solenoid for closing said clamp into engagement with the forward end of said work piece, a longitudinally extending rack on said carriage, a gear meshing with said rack, a carriage drive motor mounted on said longitudinally extending support means and engageable with said gear for driving the same so as to move said carriage, speed control means associated with said carriage drive motor for determining the speed and direction of movement of said carriage, said speed control means including a forward solenoid for causing movement of said carriage in a direction away from said work station at full speed, a reverse solenoid for causing movement of said carriage towards said work station at full speed and a slow solenoid for causing movement of said carriage at slow speed in either direction of movement, a plurality of foot stops mounted at evenly spaced intervals along said carriage, a measuring station located along said longitudinally extending support means at a fixed distance from said work station, a fraction drum mounted on said measuring station for rotation on an axis substantially parallel to the longitudinal direction of movement of said carriage, a fraction drum motor mounted on said measuring station and adapted to be placed in driving relation with said fraction drum, a fraction drum clutch interposed between said fraction drum and its associated motor for placing said fraction drum motor in driving relation with said fraction drum when said clutch is energized, a fraction drum brake associated with said fraction drum for stopping rotary movement of said fraction drum when said brake is energized, a plurality of longitudinally extending fraction cams secured to the outer surface of said fraction drum at evenly spaced intervals around the periphery thereof, the ends of said fraction cams terminating longitudinally at different distances with respect to said work station by differing amounts representing the lowest desired fraction of an inch to be employed in stopping the carriage, an inch drum support mounted on said measuring station but movable longitudinally relative thereto, a fixed stop on said inch drum support adapted to engage one end of a fraction cam on said fraction drum, a retracting solenoid adapted to move said inch drum support so that said fixed stop engages the end of an appropriate fraction cam when said fraction drum has moved to its desired position, an inch drum mounted for rotation on said inch drum support on an axis substantially parallel to the rotational axis of said fraction drum, an inch drum motor mounted on said inch drum support and adapted to be placed in driving relation with said inch drum, an inch drum clutch interposed between said inch drum and its associated motor for placing said inch drum motor in driving relation with said inch drum when said clutch is energized, an inch drum brake associated with said inch drum for stopping rotary movement of said inch drum when said brake is energized, a plurality of longitudinally extending inch cams mounted at evenly spaced intervals on the periphery of said inch drum, the ends of said inch cams facing said work station terminating at different distances relative to said work station and at one inch intervals with respect to each other, a dropping solenoid associated with said inch drum support for dropping said inch drum support downwardly when said drums have been turned to their desired positions for interposing the appropriate inch cam in the path of movement of the appropriate foot stop on said carriage when said carriage has reached its proper position of movement away from said work station, a plurality of reset cams mounted on the side of said carriage, one reset cam being provided for each foot stop, a plurality of count cams mounted on the side of the carriage, one count cam being provided for each foot stop, an advanced reset microswitch mounted on said measuring station and adapted to be contacted by said reset cams in succession upon movement of said carriage, a retarded reset microswitch mounted on said measuring station and adapted to be contacted by said reset cams in succession but subsequent in time to the contacting of said advanced reset microswitch as said carriage moves outwardly away from said work station, an advanced count microswitch mounted on said measuring station and adapted to be contacted by said count cams in succession as said carriage moves outwardly away from said work station, said advanced count microswitch being contacted by each count cam after the associated reset cam passes beyond said advanced reset microswitch but prior to the time that the carriage has moved to the foot corresponding to that intended to be counted by the advanced count microswitch, a retarded count microswitch mounted on said measuring station and adapted to be contacted by said count cams in succession subsequent to the contacting of said advanced count microswitch by the same count cam and after the reset cam has passed beyond said retarded reset microswitch, said advanced microswitches being operative when it is desired to stop said carriage in the first part of a given foot, said retarded microswitches being operative when it is desired to stop said carriage in the latter part of a given foot, a first set of positional relays for said fraction drum, means responsive to the rotary position of said fraction drum for feeding electrical energy into said first set of positional relays and for energizing various of said positional relays in accordance with the rotational position of said fraction drum, a first set of demand relays corresponding to and associated with said first set of positional relays, means responsive to the desired position to be occupied by said fraction drum for energizing various of said demand relays corresponding to said desired position of said fraction drum, said demand relays and said positional relays being so associated that each set of relays will have opposed relays similarly energized and de-energized when said fraction drum occupies the position corresponding to that called for by said demand relays, means responsive to a condition wherein said fraction drum occupies a position other than that called for by said demand relays for energizing said fraction drum clutch and for simultaneously de-energizing said fraction drum brake whereby said fraction drum will rotate until it reaches the position called for by said demand relays, means responsive to the movement of said fraction drum to the position called for by said demand relays for de-energizing said fraction drum clutch and for simultaneously energizing said fraction drum brake and said retracting solenoid, a second set of positional relays for said inch drum, means responsive to the rotary position of said inch drum for feeding electrical energy into said second set of positional relays and for energizing various of said positional relays in accordance with the rotational position of said inch drum, a second set of demand relays corresponding to and associated with said second set of positional relays, means responsive to the desired position to be occupied by said inch drum for energizing various of said second demand relays corresponding to said desired position of said inch drum, said second demand relays and said second positioned relays being so associated that each set of relays will have opposed relays similarly energized and deenergized when said inch drum occupies the position corresponding to that called for by its demand relays, means responsive to a condition wherein said inch drum occupies a position other than that called for by its demand relays for energizing said inch drum clutch and for simultaneously de-energizing said inch drum brake whereby said inch drum will rotate until it reaches the position called for by its demand relays, means responsive to the movement of said inch drum to the position called for by its demand relays for de-energizing said inch drum clutch and for simultaneously energizing said inch drum brake, means responsive to the movement of both drums to the positions called for by their associated demand relays for energizing said forward solenoid to initiate movement of said carriage in a direction away from said work station at full speed, a third set of positional relays adapted to indicate, by energization of various relays therein and in accordance with the subsequent actuation of said reset and count microswitches, the exact foot position occupied by said carriage, a third set of demand relays associated with and corresponding in number to the relays in said third set of positional relays and being variously energized to indicate the desired foot position to be occupied by said carriage, said third demand relays and said third positional relays being so associated that each set of relays will have opposing relays similarly energized and deenergized when said carriage is moved to the position corresponding to that called for by its demand relays, means responsive to the movement of said carriage to the foot position called for by its demand relays for energizing said slow solenoid and for energizing said dropping solenoid, means responsive to the contacting of said appropriate inch cam with said appropriate foot stop for de-energizing said forward solenoid and said slow solenoid so as to stop movement of said carriage, means associated with each punching machine for locating the position of said punching machine relative to the longitudinal center line of said work piece, a fourth set of positional relays for each punching machine adapted to be energized by said sensing means so that various relays of said fourth set of relays are energized depending upon the position of said punching machine relative to said longitudinal center line, a fourth set of demand relays associated with each punching machine and being equal in number and associated with the relays of said fourth set of positional relays, means for energizing various of said fourth set of demand relays in accordance with the desired punching position of said punching machine, means for moving said punching machine relative to said longitudinal center line until said punching machine occupies the position called for by said fourth set of demand relays whereby the energized and deenergized condition of the relays in said fourth set of positional relays will match the energized and de-energized condition in said fourth set of demand relays, and means responsive both to the stopping of said carriage at its appropriate position and to the movement of said punching machine to its appropriate position for energizing said punching machine to punch a hole in said work piece.

11. An automatic control means as set forth in claim 10 including direction sensing means for sensing the difference between the unmatched condition of said two fourth sets of relays for determining the required direction of movement of said punching machine in order to move said punching machine from its instantaneous position to that called for by said fourth demand relays.

12. An automatic control means as set forth in claim 11 wherein said direction sensing means includes a plurality of transistor stages operated in sequence.

13. An automatic control means as set forth in claim 11 wherein said direction sensing means includes a plurality of relay modules operated in sequence.

14. Means for automatically controlling the movement of a movable element from a given reference position comprising a plurality of positional relays, each positional relay representing a different incremental value of movement for said element whereby said element is movable from said reference position a minimum distance representing the energization of the positional relay corresponding to the smallest increment to a maximum distance representing the energization of all of the positional relays, said element being movable to positions between said minimum and maximum distances representing the energization of less than all of said positional relays, means responsive to the instantaneous position of said element for energizing various of said positional relays in accordance with said instantaneous position, a set of demand relays equal in number and associated with said positional relays, means for energizing said demand relays in accordance with a position in which it is desired to have said element located, said demand relays and said positional relays being so associated with each other that the energized and de-energized conditions of the opposed relays in said sets of relays will match when the instantaneous position of said element coincides with the desired position called for by said demand relays, means responsive to an unmatched condition between said two sets of relays for moving said element towards the position called for by said demand relays, and means responsive to a matched condition of said two sets of relays for stopping the movement of said element.

15. An automatic control means as set forth in claim 14 including a direction sensing means for sensing the difference between the unmatched condition of said two sets of relays for determining the required direction of movement of said element in order to move said element from its instantaneous position to that called for by said demand relays.

16. An automatic system for moving a work piece a predetermined longitudinal distance through and beyond a work station comprising a work station, a longitudinally extending support means mounted on opposite sides of said work station, a longitudinally extending track mounted adjacent said longitudinal support means, a carriage mounted on said track and movable therealong for drawing a work piece longitudinally through said work station, a clamp means on one end of said carriage for engaging one end of said work piece, a carriage drive motor for moving said carriage, speed control means associated with said carriage drive motor for determining the speed and direction of movement of said carriage, said speed control means including a forward means for causing movement of said carriage in a direction away from said work station at full speed, a reverse means for causing movement of said carriage towards said work station at full speed and a slow means for causing movement of said carriage at slow speed in either direction of movement, a plurality of foot stops mounted at evenly spaced intervals parallel to the direction of movement of said work piece, a fraction drum mounted for rotation on an axis substantially parallel to the longitudinal direction of movement of said carriage, a plurality of longitudinally extending fraction cams secured to the outer surface of said fraction drum at evenly spaced intervals around the periphery thereof, the ends of said fraction cams terminating longitudinally at different distances with respect to each other by differing amounts representing the lowest desired fraction of an inch to be employed in stopping the carriage, an inch drum support mounted in cooperative association with said fraction drum but movable longitudinally relative thereto, a fixed stop on said inch drum support adapted to engage one end of a fraction cam on said fraction drum, a retracting means adapted to move said inch drum support so that said fixed stop engages the end of an appropriate fraction cam when said fraction drum has moved to its desired position, an inch drum mounted for rotation on said inch drum support on an axis substantially parallel to the rotational axis of said fraction drum, a plurality of longitudinally extending inch cams mounted at evenly spaced intervals on the periphery of said inch drum, the ends of said inch cams terminating at different one inch intervals with respect to each other, a dropping means associated with said inch drum support for moving said inch drum support, when said drums have been turned to their desired positions, so as to interpose the appropriate inch cam in the path of relative movement with respect to the appropriate foot stop when said carriage has reached its proper position of movement away from said work station, a plurality of reset means mounted along the path of movement of said work piece, one reset means being provided for each foot stop, a plurality of count means mounted along the path of movement of said work piece, one count means being provided for each foot stop, an advanced reset means adapted to be contacted by said reset means in succession upon movement of said carriage, a retarded reset means adapted to be contacted by said reset means in succession but subsequent in time to the contacting of said advanced reset means as said carriage moves outwardly away from said work station, an advanced count means adapted to be contacted by said count means in succession as said carriage moves outwardly away from said work station, said advanced count means being contacted by each count means after the associated reset means passes beyond said advanced reset means but prior to the time that the carriage has moved to the foot corresponding to that intended to be counted by the advanced count means, a retarded count means adapted to be contacted by said count means in succession subsequent to the contacting of said advanced count means by the same count means and after the associated advanced reset means has moved relatively beyond said retarded reset means, said advanced means being operative when it is desired to stop said carriage in the first part of a given foot, said retarded means being operative when it is desired to stop said carriage in the latter part of a given foot, means for rotating said fraction drum until it reaches a desired position, means responsive to the rotation of said fraction drum to the desired position for energizing said retracting means, means for rotating said inch drum until it reaches a desired position, means responsive to the rotation of both drums to their desired positions for energizing said forward means to initiate movement of said carriage in a direction away from said work station at full speed, means responsive to the actuation of said advanced count means and said retarded count means by a predetermined number of count means for energizing said slow means and for energizing said dropping means and means responsive to the contacting of said appropriate inch cam with said appropriate foot stop for de-energizing said forward means and said slow means so as to stop movement of said carriage.

References Cited by the Examiner

UNITED STATES PATENTS

| | | | |
|---|---|---|---|
| 2,347,054 | 4/1944 | Hunt | 187—29 |
| 2,592,770 | 4/1952 | Waldie | 318—265 X |
| 2,661,036 | 12/1953 | Balch | 318—467 X |
| 2,707,501 | 5/1955 | Craik | 318—467 X |
| 2,714,906 | 8/1955 | Peterson | 318—265 X |
| 2,889,508 | 6/1959 | McCoy | 318—467 X |
| 2,926,471 | 3/1960 | Bricker | 318—265 X |
| 2,943,563 | 7/1960 | Shiffman | 318—467 X |
| 3,092,254 | 6/1963 | Germen | 318—467 X |
| 3,094,028 | 6/1963 | Ausenda | 83—71 |

ANDREW R. JUHASZ, *Primary Examiner.*

J. L. SEITCHIK, *Assistant Examiner.*